(12) United States Patent
Nishizawa et al.

(10) Patent No.: US 8,947,052 B2
(45) Date of Patent: Feb. 3, 2015

(54) CHARGE-DISCHARGE CONTROL CIRCUIT, SEMICONDUCTOR INTEGRATED CIRCUIT, METHOD OF CONTROLLING CHARGING AND DISCHARGING

(75) Inventors: Akihiro Nishizawa, Tokyo (JP); Takashi Takeda, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 396 days.

(21) Appl. No.: 13/502,152

(22) PCT Filed: Oct. 26, 2010

(86) PCT No.: PCT/JP2010/068979
§ 371 (c)(1),
(2), (4) Date: Apr. 16, 2012

(87) PCT Pub. No.: WO2011/052594
PCT Pub. Date: May 5, 2011

(65) Prior Publication Data
US 2012/0206105 A1   Aug. 16, 2012

(30) Foreign Application Priority Data

Oct. 27, 2009 (JP) .................................. 2009-246814
Feb. 10, 2010 (JP) .................................. 2010-027467

(51) Int. Cl.
*H02J 7/00* (2006.01)
*H01M 10/44* (2006.01)
*H01M 10/48* (2006.01)

(52) U.S. Cl.
CPC ........... *H02J 7/0016* (2013.01); *H01M 10/441* (2013.01); *H01M 10/482* (2013.01)
USPC ............................ 320/134; 320/135; 320/136

(58) Field of Classification Search
USPC .................................. 320/134–136, 118–119
See application file for complete search history.

(56) References Cited

U.S. PATENT DOCUMENTS 4,238,721 A * 12/1980 DeLuca et al. ................. 320/122
5,825,155 A * 10/1998 Ito et al. ......................... 320/118
7,508,165 B2    3/2009 Sobue et al.

FOREIGN PATENT DOCUMENTS

| JP | 07-087673 | 3/1995 |
| JP | 2006-121776 | 5/2006 |
| JP | 2007-330003 | 12/2007 |
| JP | 2008-295250 | 12/2008 |
| JP | 2009-038876 | 2/2009 |
| WO | WO 2009/017009 | 2/2009 |

OTHER PUBLICATIONS

International Search Report mailed on Feb. 8, 2011.

\* cited by examiner

Primary Examiner — Samuel Berhanu
(74) Attorney, Agent, or Firm — IPUSA, PLLC

(57) ABSTRACT

A charge-discharge control circuit includes a cell balance detection circuit that detects that a voltage of a cell reaches a predetermined voltage; a memory circuit that stores the cell that reaches the predetermined voltage first among plural of the cells; bypass circuits respectively connected to the plural cells in parallel, each of the bypass circuits including a switch unit for bypassing the current that flows through the corresponding cell when charging; and a control circuit that controls the switch units, wherein the control circuit controls the switch unit based on the cell stored in the memory circuit so that an ON/OFF status of the switch unit is maintained from a start to an end of a next charging operation subsequent to a charging operation during which the cell is stored in the memory circuit.

13 Claims, 30 Drawing Sheets

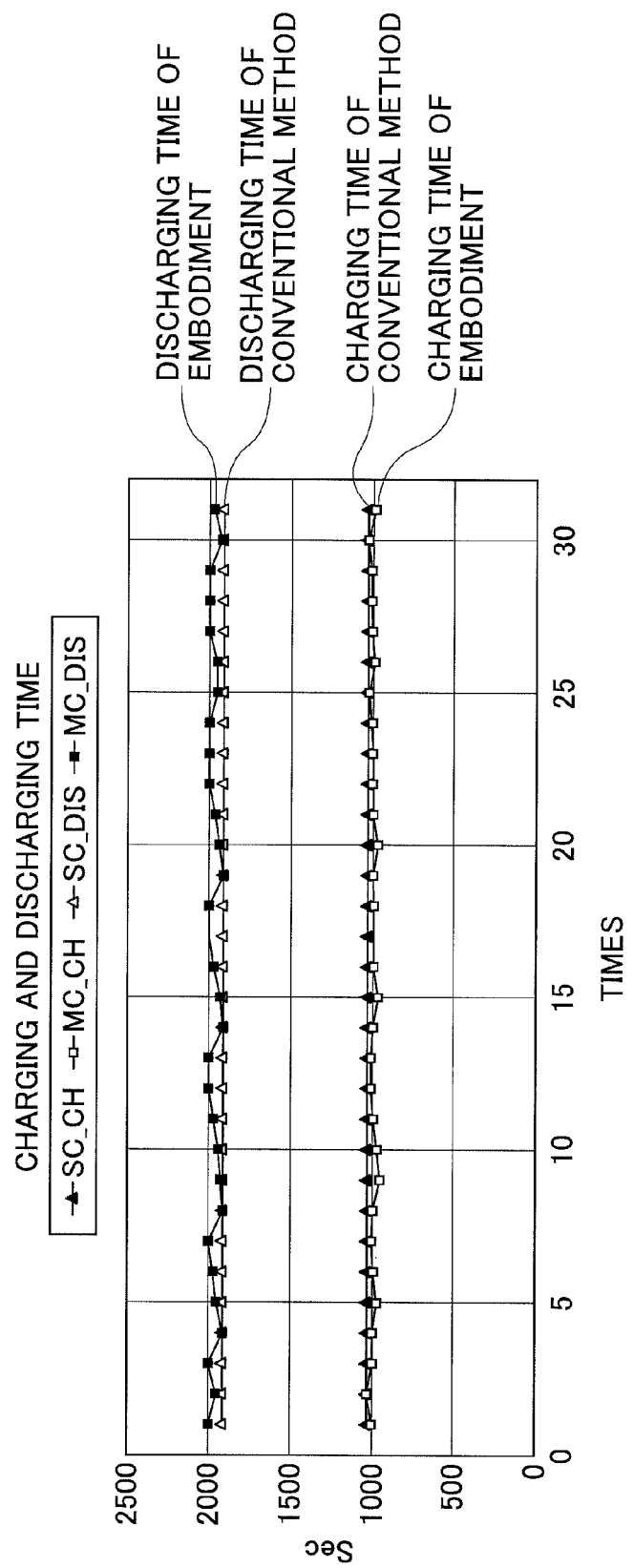

CHARGE-DISCHARGE CONTROL CIRCUIT, SEMICONDUCTOR INTEGRATED CIRCUIT, METHOD OF CONTROLLING CHARGING AND DISCHARGING

TECHNICAL FIELD

The present invention relates to a charge-discharge control circuit that controls charging and discharging of a secondary battery including plural cells, a semiconductor integrated circuit on which the charge-discharge control circuit is mounted, a method of controlling charging and discharging by the charge-discharge control circuit, and a charging and discharging control program.

BACKGROUND ART

There exists a battery pack of a secondary battery using a lithium ion battery or the like configured by plural secondary batteries (hereinafter, referred to as "cell") connected in series. For such a battery pack, when the voltage difference between cells becomes large by repeating charging and discharging, self-discharge or the like, the capacity balance between the cells (hereinafter, referred to as "cell balance") may not maintained. When the cell balance is not maintained, the charging capacity capable of being used as a battery pack is lowered to decrease efficiency of charging and discharging.

Further, when charging and discharging are repeated while the cell balance is not maintained, the voltage difference between cells becomes larger so that there may be a case that the cell having the voltage near the overcharge voltage and the cell having the voltage near the over-discharge voltage are provided in the battery pack. Thus, a situation occurs that the battery pack cannot be charged or discharged even though the individual cells are not deteriorated.

Therefore, a function for maintaining the cell balance is necessary for the battery pack including plural cells.

FIG. 1 is a diagram for explaining a conventional charge-discharge control circuit. A conventional charge-discharge control circuit 50 controls charging and discharging of a battery pack by controlling ON/OFF of a transistor for controlling charging MDOUT that controls charging of the battery pack and a transistor for controlling discharging MDOUT that controls discharging from the battery pack.

In the battery pack, cells BAT1 to BAT3 connected in series and a voltage detection circuit 70 that detects the voltage of the cells BAT1 to BAT3 are provided. The voltage detection circuit 70 is composed of voltage detection circuits 10, 30 and 35 respectively provided for the cells BAT1 to BAT3. The voltage detection circuits 10, 30 and 35 have the same structure. The voltage detection circuits 10, 30 and 35 detect that the voltages of the cells BAT1 to BAT3 reach an overcharge detection voltage or an over-discharge detection voltage, respectively.

When one of the cells BAT1 to BAT3 is detected to reach the overcharge detection voltage, a charge terminate signal indicating to terminate charging of the battery pack is output from the NOR circuit 18 via a level shift circuit 19. By the charge terminate signal, the transistor for controlling charging MCOUT is switched off to terminate charging of the battery pack.

Further, when one of the cells BAT1 to BAT3 is detected to reach the over-discharge detection voltage, a discharge terminate signal indicating to terminate discharging from the battery pack is output from an AND circuit 17. By the discharge terminate signal, the transistor for controlling discharging MDOUT is switched off to terminate discharging from the battery pack.

Further, for the cells BAT1 to BAT3, bypass circuits 20, 40 and 60 are respectively provided to be in parallel with the corresponding cells BAT1 to BAT3. The bypass circuits 20, 40 and 60 have the same structure. The bypass circuit 20 is composed of a resistor Ra and a switch element 21 which are connected in series. The charge-discharge control circuit 50 controls the switch element 21 of the bypass circuit 20 based on the voltages of the cells BAT1 to BAT3 detected by the voltage detection circuits 10, 30 and 35 to decrease the voltage difference between cells.

FIG. 2 is a diagram showing the voltage detection circuit. The voltage detection circuit 10 corresponds to the cell BAT1. As the voltage detection circuits 30 and 35 have the same structure as the voltage detection circuit 10, explanation is not repeated.

The voltage detection circuit 10 includes a comparator 11, a charge terminate delay circuit 12, a comparator 13, a cell balance delay circuit 14, a comparator 15, and an over-discharge delay circuit 16. The bypass circuit 20 is connected with the cell BAT1 in parallel.

The comparator 11 detects the termination of charging of the cell BAT1. The charge terminate delay circuit 12 outputs a charge terminate signal that terminates charging of the battery pack after being delayed for a predetermined period when the overcharge is detected by the comparator 11. The comparator 13 detects that the voltage of the cell BAT1 reaches a cell balance detection voltage VEAL, and detects that the voltage of the cell BAT1 is lowered to a cell balance detection voltage VBAU. The cell balance delay circuit 14 outputs a control signal that causes the switch element 21 to be switched on after being delayed for a predetermined period when the voltage of the cell BAT1 becomes the cell balance detection voltage VBAL. The over-discharge delay circuit 16 outputs a discharge terminate signal that terminates discharging from the battery pack after being delayed for a predetermined period when the comparator 15 detects the over-discharge. The overcharge detection voltage, the cell balance detection voltage and the over-discharge detection voltage are set by resistors R.

When the switch element 21 is switched on in the bypass circuit 20, the current is divided so that the charge current that flows through the cell BAT1 is reduced. Similarly for the other cells BAT2 and BAT3, when each of the cells BAT2 and BAT3 reaches the cell balance detection voltage, the current is divided to reduce the charge current that flows through the corresponding cell BAT2 or BAT3 to decrease the voltage difference between cells.

In addition to the example shown in FIG. 2, Patent Document 1, for example, discloses a cell voltage equalizing apparatus for a battery pack capable of performing equalization even when the difference between the voltages of the cells is large. Further, Patent Document 2 discloses a method capable of appropriately and safely controlling charging of secondary batteries connected in series to prevent shortening of the lifetime of the batteries. Further, Patent Document 3 discloses a method in which a cell whose voltage is higher is detected among plural cells and, the detected cell is discharged by a discharging circuit provided in the battery pack to equalize the cell balance.

PATENT DOCUMENT

[Patent Document 1] Japanese Laid-open Patent Publication No. 2006-121776

[Patent Document 2] Japanese Laid-open Patent Publication No. H07-87673

[Patent Document 3] Japanese Laid-open Patent Publication No. 2008-295250

DISCLOSURE OF THE INVENTION

For the above described charge-discharge control circuit, as the charge current is divided to be decreased for all of the cells whose voltage reaches the cell balance detection voltage, there is a case when the voltage difference between cells cannot be sufficiently reduced. Further, by increasing the current (hereinafter, referred to as "bypass current") to be divided to the bypass circuit 20 in order to compensate for this, the charge current is further decreased so that more time is necessary to complete charging. Further, if the bypass current is not increased and the period at which the switch element 21 of the bypass circuit 20 is switched on is extended, it is necessary to extend the period at which the switch element 21 is switched on to a discharging period where the voltages of the other cells are decreased to be another predetermined voltage.

Thus, in the conventional charge-discharge control circuit, in order to sufficiently decrease the voltage difference between cells, it is necessary for the current to be supplied to the bypass circuit 20 not only at charging but also at discharging. Therefore, the current which should be supplied to a load is consumed by the bypass circuit 20 to reduce the efficiency of use of the electric charge stored in the cells.

Further, for the conventional charge-discharge control circuit, as the cell whose charging capacity is the smallest always reaches the charge terminate voltage first, the cell which becomes the maximum voltage may be fixed for every charging period. Thus, the deterioration of the battery pack is concentrated on the specific cell to cause a reduction of capacity and lowering of the lifetime of the battery pack.

The present invention is made in light of the above problems, and provides a charge-discharge control circuit, a semiconductor integrated circuit, a method of controlling charging and discharging, and a charging and discharging control program capable of improving efficiency of use of the electric charge stored in the cells and extending the lifetime of the battery pack.

In order to achieve the above purpose, the following structures are provided.

According to an embodiment, there is provided a charge-discharge control circuit (300, 300A to 300H) for controlling charging and discharging of a secondary battery including plural cells (BAT1 to BAT3, BAT21 to BAT23, BAT41 to BAT43, BAT51 to BAT53, BAT61 to BAT66), including, a cell balance detection circuit (111, 131, 23) that detects that a voltage of the cell reaches a predetermined voltage, a memory circuit (113, 133, 24B, 24C) that stores a cell that reaches the predetermined voltage first among the plural cells (BAT1 to BAT3, BAT21 to BAT23, BAT41 to BAT43, BAT51 to BAT53, BAT61 to BAT66), bypass circuits (120, 140, 160, 21 to 23, 31, 41 to 43, 51 to 53, 61 to 66) respectively connected to the plural cells in parallel, each of the bypass circuits including a switch unit (M1 to M3, M21 to M23, M31, M41 to M43, M51 to M53, M61 to M66) for bypassing the current that flows through the corresponding cell when charging, and a control circuit (116, 136, 24D) that controls the switch units (M1 to M3, M21 to M23, M31, M41 to M43, M51 to M53, M61 to M66), wherein the control circuit (116, 136, 24D) controls the switch unit based on the cell stored in the memory circuit (113, 133, 24B, 24C) so that an ON/OFF status of the switch unit (M1 to M3, M21 to M23, M31, M41 to M43, M51 to M53, M61 to M66) is maintained from a start to an end of a next charging operation subsequent to a charging operation during which the cell is stored in the memory circuit.

According to the charge-discharge control circuit of the embodiment, the control circuit (116, 136, 24D) switches on the switch unit (M1 to M3, M21 to M23, M31, M41 to M43, M51 to M53, M61 to M66) of the bypass circuit (120, 140, 160, 21 to 23, 31, 41 to 43, 51 to 53, 61 to 66) connected to the cell which is stored in the memory circuit (113, 133, 24B, 24C) when the next charging operation subsequent to the charging operation during which the cell is stored in the memory circuit (113, 133, 24B, 24C) is started.

Further, according to the charge-discharge control circuit of the embodiment, the predetermined voltage is a charge terminate voltage that detects termination of charging the cells.

The charge-discharge control circuit of the embodiment further includes, an over-discharge detection circuit (114, 134, 25) that detects that a voltage of the cell becomes lower than or equal to a predetermined voltage;

a discharge control circuit (115, 135, 210, 26, 211) that controls discharging of the cells based on the detected result by the over-discharge detection circuit (114, 134, 25);

a charge termination detection circuit (21) that detects that a voltage of the cell becomes higher or equal to a charge terminate voltage; and a charge control circuit (112, 132, 220, 22, 212) that controls charging of the cells based on the charge termination detection circuit (21) or the cell balance detection circuit (111, 131).

Further, the charge-discharge control circuit of the embodiment further includes, a transistor for controlling discharging (MDOUT) for which ON/OFF is controlled based on the detected result by the over-discharge detection circuit (114, 134, 25); and a transistor for controlling charging (MDOUT) for which ON/OFF is controlled by the charge control circuit (112, 132, 220, 22, 212).

According to an embodiment, there is provided a semiconductor integrated circuit (200, 200A, 250, 370, 470, 510, 520, 530, 640, 660) for controlling charging and discharging of a secondary battery including plural cells (BAT1 to BAT3, BAT21 to BAT23, BAT41 to BAT43, BAT51 to BAT53, BAT61 to BAT66), including, a cell balance detection circuit (111, 131, 23) that detects that a voltage of the cell reaches a predetermined voltage;

a memory circuit (113, 133, 24B, 24C) that stores the cell that reaches the predetermined voltage first among the plural cells; and a control circuit (116, 136, 24D) that controls switch units (M1 to M3, M21 to M23, M31, M41 to M43, M51 to M53, M61 to M66) of bypass circuits (120, 140, 160, 21 to 23, 31, 41 to 43, 51 to 53, 61 to 66), each of the bypass circuits including the switch unit for bypassing the current that flows through the corresponding cell when charging;

wherein the control circuit (116, 136, 24D) controls the switch unit based on the cell stored in the memory circuit (113, 133, 24B, 24C) so that an ON/OFF status of the switch unit (M1 to M3, M21 to M23, M31, M41 to M43, M51 to M53, M61 to M66) is maintained from a start to an end of a next charging operation subsequent to a charging operation during which the cell is stored in the memory circuit.

Further, the semiconductor integrated circuit includes the plural bypass circuits (120, 140, 160, 21 to 23, 31, 41 to 43, 51 to 53, 61 to 66).

According to an embodiment, there is provided a method of controlling charging and discharging by a charge-discharge control circuit (300, 300A to 300H) that controls charging and discharging of a secondary battery including plural cells (BAT1 to BAT3, BAT21 to BAT23, BAT41 to BAT43, BAT51 to BAT53, BAT61 to BAT66), including, a cell balance detecting step (111, 131, 23) of detecting that a voltage of the cell reaches a predetermined voltage;

a storing step (113, 133, 24B, 24C) of storing the cell in a memory circuit that reaches the predetermined voltage first among the plural cells the plural cells; and a controlling step (116, 136, 24D) of controlling switch units (M1 to M3, M21 to M23, M31, M41 to M43, M51 to M53, M61 to M66) of bypass circuits (120, 140, 160, 21 to 23, 31, 41 to 43, 51 to 53, 61 to 66), each of the bypass circuits including the switch unit for bypassing the current that flows through the corresponding cell when charging;

wherein in the controlling step (116, 136, 24D), the switch unit (M1 to M3, M21 to M23, M31, M41 to M43, M51 to M53, M61 to M66) is controlled based on the cell stored in the storing step (113, 133, 24B, 24C) so that an ON/OFF status of the switch unit (M1 to M3, M21 to M23, M31, M41 to M43, M51 to M53, M61 to M66) is maintained from a start to an end of a next charging operation subsequent to a charging operation during which the cell is stored in the memory circuit (113, 133, 24B, 24C).

According to an embodiment, there is provided a charging and discharging control program executed in a protection module, the protection module (900) including:

a charge-discharge control circuit (800 to 800n) that includes a cell balance detection unit (773) detecting that a voltage of a battery including plural cells reaches a predetermined voltage, and controls charging and discharging of the plural cells; and a processing unit (910) that controls the charge-discharge control circuit (800 to 800n), the program including having the processing unit (910) execute:

a detected result receiving step (S2402) of receiving a detected result by the cell balance detection unit (773);

a storing step (S2406) of storing the cell in a memory area of the processing unit (910) that reaches the predetermined voltage first among the plural cells the plural cells; and a controlling step of controlling switch units (M72, M73, M74) of bypass circuits (720, 730, 740), each of the bypass circuits (720, 730, 740) including the switch unit (M72, M73, M74) for bypassing the current that flows through the corresponding cell when charging;

wherein in the controlling step, the switch unit (M72, M73, M74) is controlled based on the cell stored in the storing step so that an ON/OFF status of the switch unit (M72, M73, M74) is maintained from a start to an end of a next charging operation subsequent to a charging operation during which the cell is stored in the memory area.

According to an embodiment, there is provided a charging and discharging control program executed in a protection module, the protection module including:

a charge-discharge control circuit (800A to 800An) that includes a voltage monitor unit (700A to 700An) monitoring voltages of plural cells, and controls charging and discharging of the plural cells; and a processing unit (910A) that controls the charge-discharge control circuit (800A to 800An), the program including having the processing unit (910A) execute:

a cell balance detection step of receiving voltage monitored by the voltage monitor unit (700A to 700An) from the charge-discharge control circuit, and detecting whether the voltage reaches a predetermined voltage;

a storing step of storing the cell in a memory area of the processing unit that reaches the predetermined voltage first among the plural cells the plural cells; and a controlling step of controlling switch units (M72, M73, M74) of bypass circuits (720, 730, 740), each of the bypass circuits (720, 730, 740) including the switch unit (M72, M73, M74) for bypassing the current that flows through the corresponding cell when charging;

wherein in the controlling step, the switch unit (M72, M73, M74) is controlled based on the cell stored in the storing step so that an ON/OFF status of the switch unit (M72, M73, M74) is maintained from a start to an end of a next charging operation subsequent to a charging operation during which the cell is stored in the memory area.

The above reference numerals are just for example and the present invention is not limited to by them.

According to the embodiment, it is possible to improve efficiency of use of the electric charge stored in the cells and extend the lifetime of the battery pack.

BRIEF DESCRIPTION OF DRAWINGS

FIG. 7 is a diagram in which charging time and discharging time of the conventional charge-discharge control circuit and charging time and discharging time of the charge-discharge control circuit of the first embodiment are compared;

DESCRIPTION OF MARKS AND NUMERALS 100, 110, 130, 150, 240, 260, 270, 280: VOLTAGE DETECTION CIRCUIT
300, 300A to 300H: CHARGE-DISCHARGE CONTROL CIRCUIT
200, 200A, 250, 370, 470: SEMICONDUCTOR INTEGRATED CIRCUIT

DETAILED DESCRIPTION OF THE PREFERRED EMBODIMENTS

In this embodiment, the identity of a cell which reaches a predetermined voltage is stored (or recorded), and a switch element of a bypass circuit corresponding to the stored cell is switched on at a next charging operation.

First Embodiment

Figure 1:
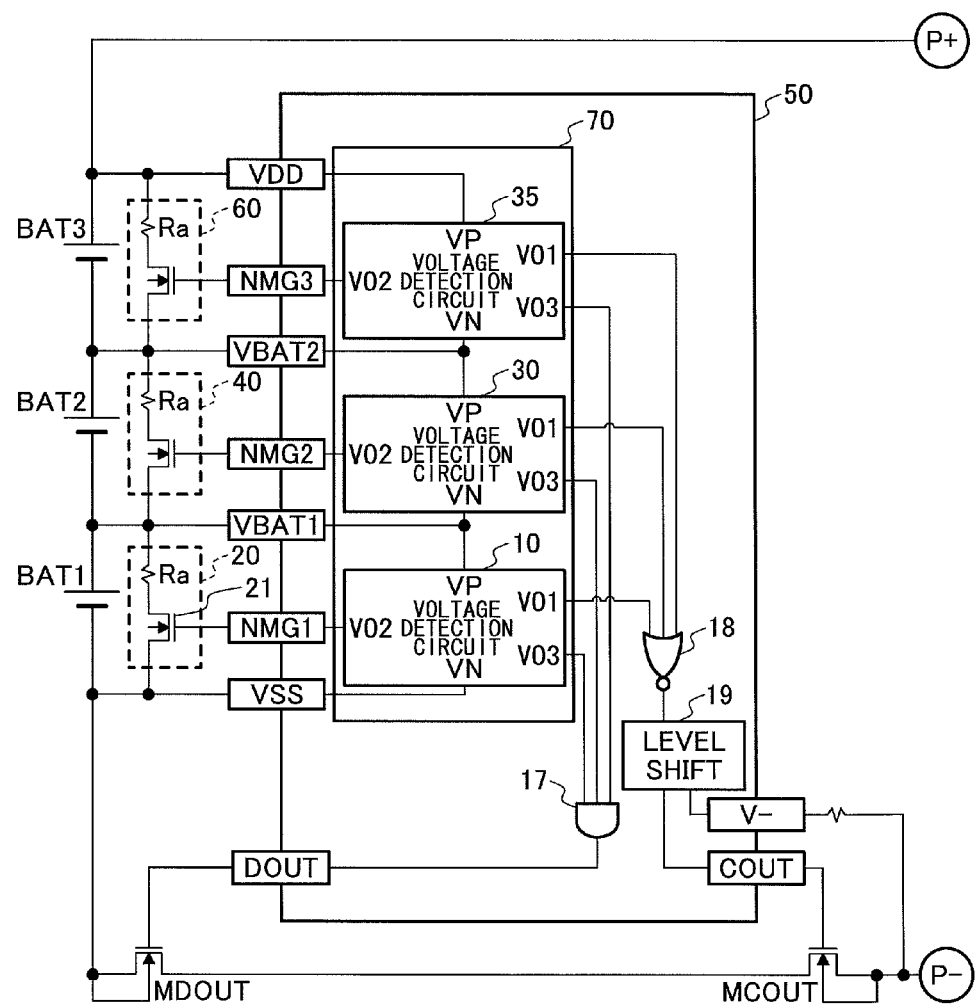
FIG. 1 is a diagram for explaining a conventional charge-discharge control circuit.
Figure 2:
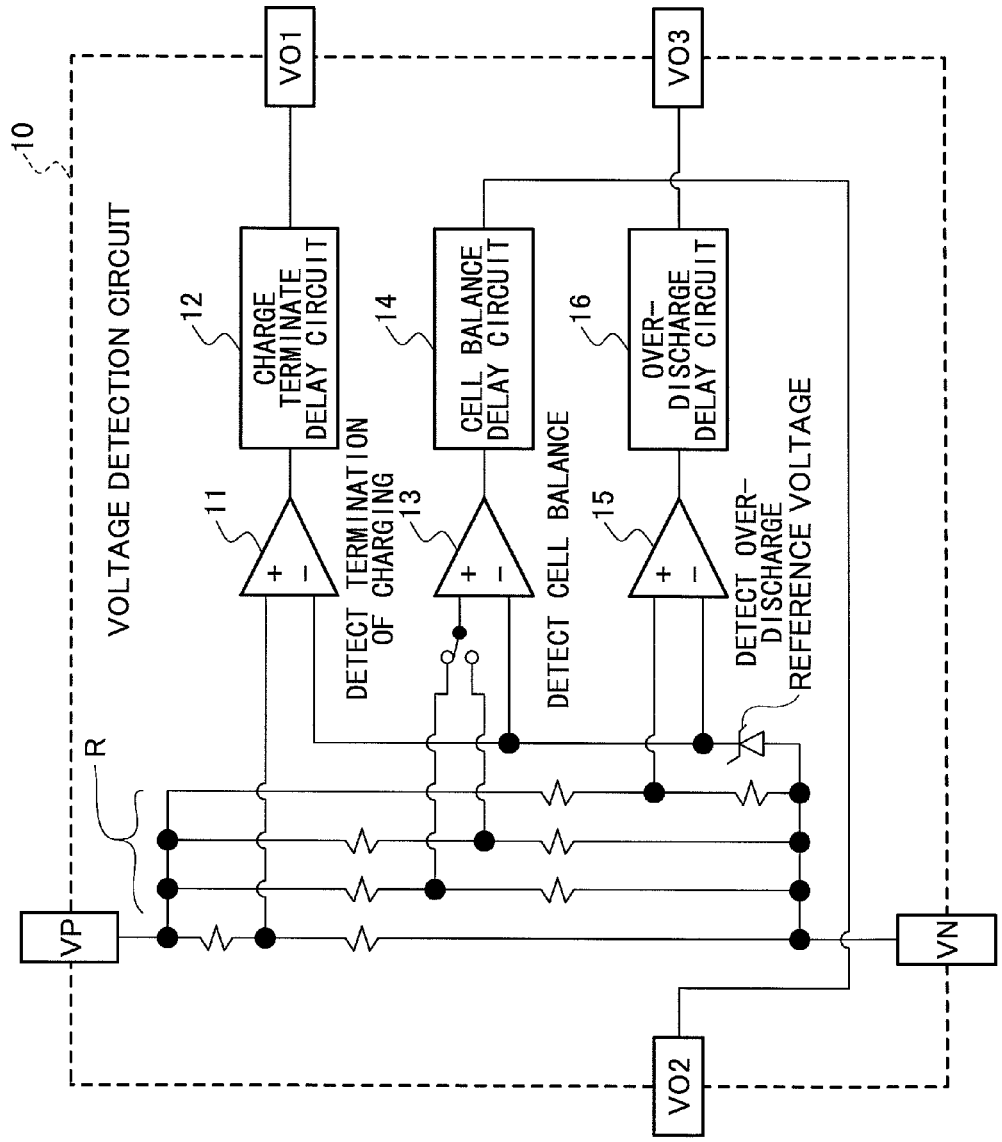
FIG. 2 is a diagram showing a conventional voltage detection circuit.
Figure 3:
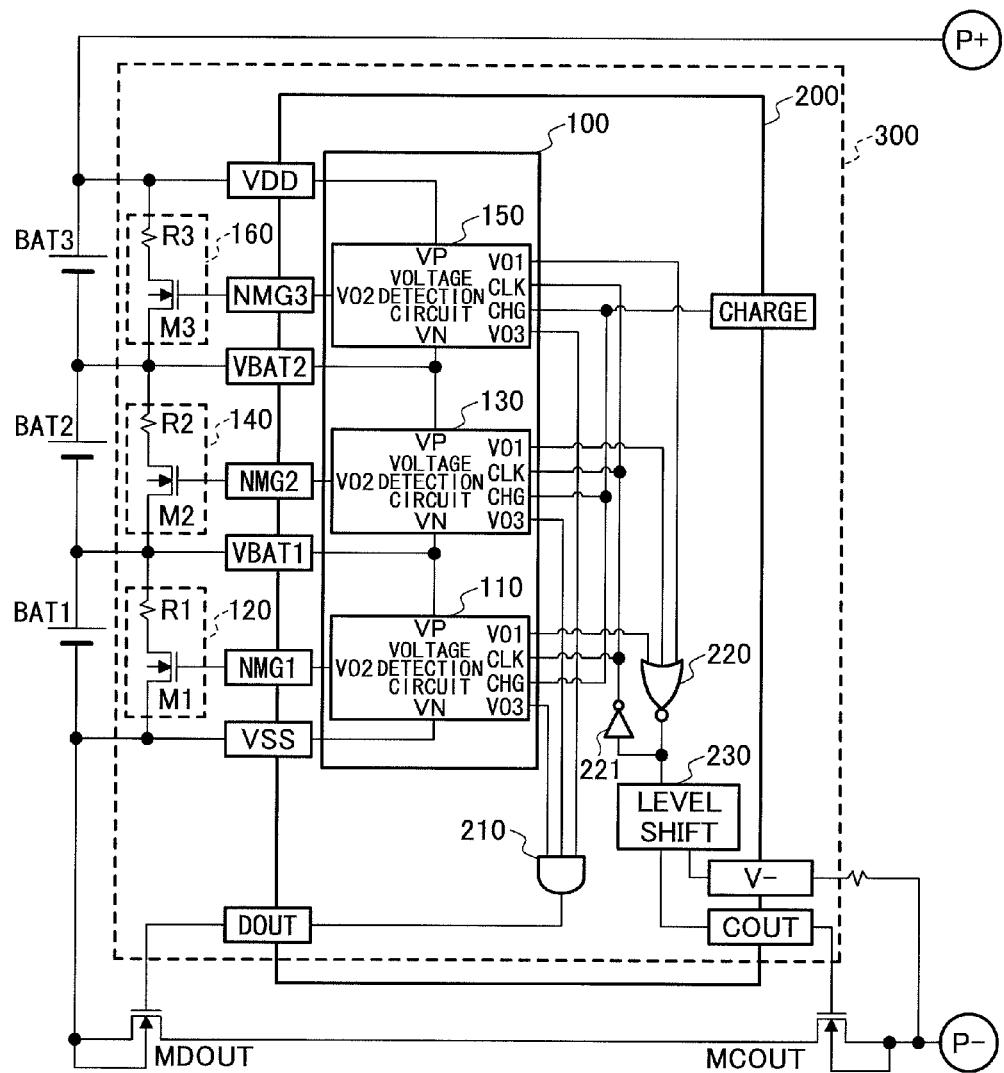
FIG. 3 is a diagram for explaining a charge-discharge control circuit of a first embodiment.

The first embodiment is described with reference to drawings. FIG. 3 is a diagram for explaining a charge-discharge control circuit of the first embodiment.

A charge-discharge control circuit 300 of the embodiment is connected between plural cells which are connected in series and a load, and controls charging and discharging of the plural cells. The charge-discharge control circuit 300 of the embodiment controls charging and discharging of the plural cells by controlling ON/OFF of a transistor for controlling charging MCOUT and a transistor for controlling discharging MDOUT connected in series between an anode side of the plural cells and an anode side of the load.

The charge-discharge control circuit 300 of the embodiment includes a voltage detection circuit 100, bypass circuits 120, 140 and 160, an AND circuit 210, a NOR circuit 220, an INV circuit 221, and a level shift circuit 230.

The voltage detection circuit 100 includes plural voltage detection circuits 110, 130 and 150 respectively provided for the plural cells composing a battery pack. The voltage detection circuit 110 is connected to the bypass circuit 120, and the bypass circuit 120 is connected to a cell BAT1 in parallel. The voltage detection circuit 130 is connected to the bypass circuit 140, and the bypass circuit 140 is connected to a cell BAT2 in parallel. The voltage detection circuit 150 is connected to the bypass circuit 160, and the bypass circuit 160 is connected to the cell BAT3 in parallel.

The voltage detection circuits 110, 130 and 150 of the voltage detection circuit 100 have the same structure, respectively. Further, the bypass circuits 120, 140 and 160 have the same structure, respectively. Therefore, in the following of the embodiment, only the voltage detection circuit 110 and the bypass circuit 120 connected to the cell BAT1 are explained.

The bypass circuit 120 of the embodiment is composed of a resistor R1 and a switch element M1 connected in series. Similar to the bypass circuit 120, the bypass circuit 140 is composed of a resistor R2 and a switch element M2 connected in series, and the bypass circuit 160 is composed of a resistor R3 and a switch element M3 connected in series.

The AND circuit 210 outputs a control signal that controls ON/OFF of the transistor for controlling discharging MDOUT. The NOR circuit 220 outputs a control signal that controls ON/OFF of the transistor for controlling charging MCOUT. The level shift circuit 230 shifts a level of the control signal output from the NOR circuit 220. The INV circuit 221 inverts an output from the NOR circuit 220 to be supplied to CLK terminals of the voltage detection circuits 110, 130 and 150, respectively.

For the charge-discharge control circuit 300 of the embodiment, the voltage detection circuit 100, the AND circuit 210, the NOR circuit 220, the INV circuit 221 and the level shift circuit 230 may be mounted on a semiconductor integrated circuit 200.

Figure 4:
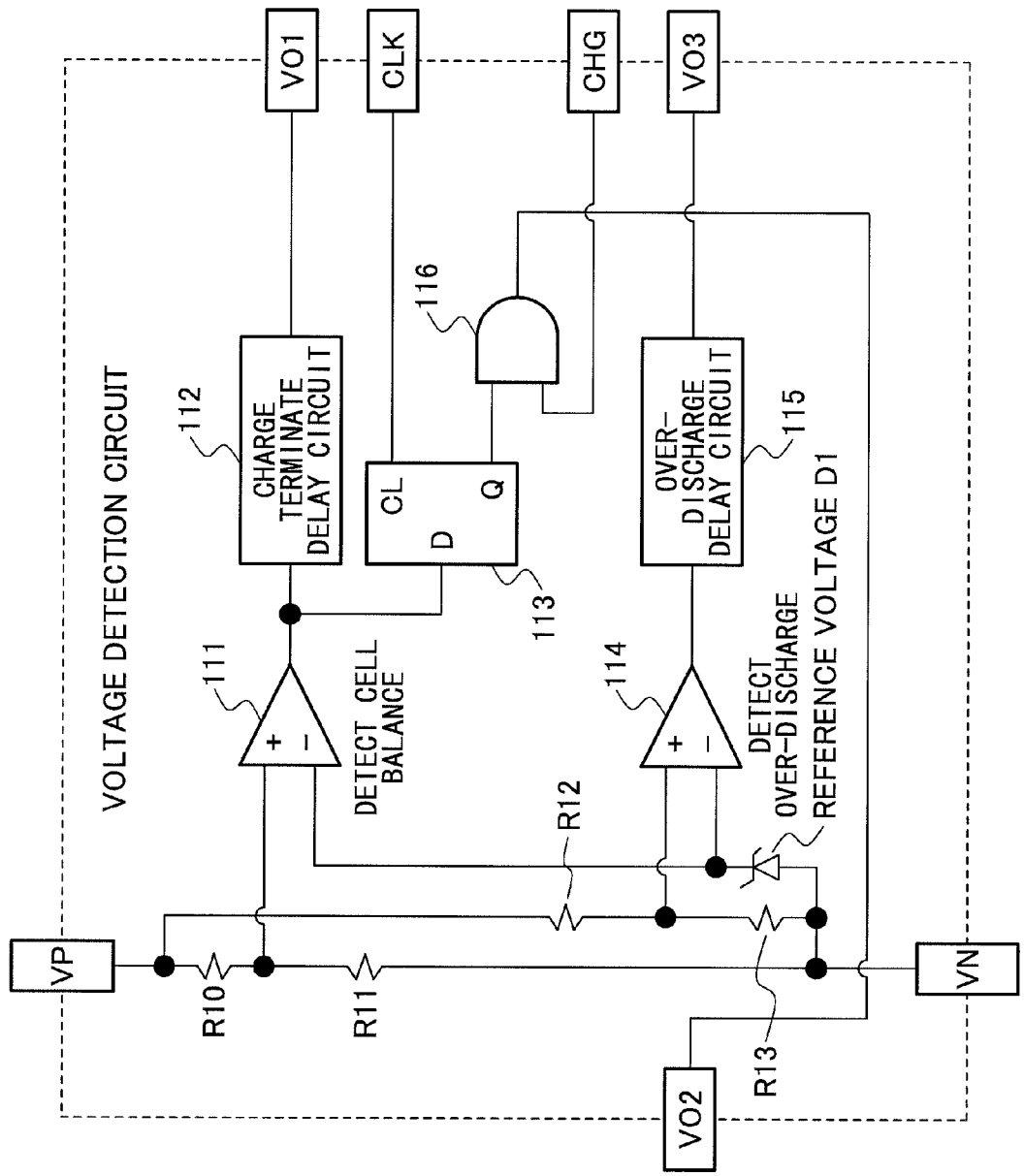
FIG. 4 is a diagram for explaining a voltage detection circuit of the first embodiment.

FIG. 4 is a diagram for explaining the voltage detection circuit of the first embodiment. FIG. 4 shows an example of the voltage detection circuit 110 that detects a voltage of the cell BAT1. The voltage detection circuit 110 of the embodiment controls a charge current that flows through the cell BAT1 by controlling ON/OFF of the switch element M1 of the bypass circuit 120 based on the voltage of the cell BAT1.

Similar to the voltage detection circuit 110, the voltage detection circuit 130 of the embodiment controls a charge current that flows through the cell BAT2 by controlling ON/OFF of the switch element M2 of the bypass circuit 140.

For the voltage detection circuit 110 of the embodiment, a cell balance detection voltage which is lower than an overcharge detection voltage is set, and when the voltage of the cell BAT1 reaches the cell balance detection voltage, the cell BAT1 is stored in the memory circuit 113, and at the same time, charging of the battery pack is terminated. It means that in this embodiment, the cell balance detection voltage also functions as a charge terminate voltage.

Further, in this embodiment, among all of the cells included in the battery pack, a cell which reaches the cell balance detection voltage first is stored, and a charge current for the stored cell is controlled to be decreased in a next charging cycle.

The voltage detection circuit 110 of the embodiment includes a comparator 111, a charge terminate delay circuit 112, a memory circuit 113, a comparator 114, an over-discharge delay circuit 115, an AND circuit 116, resistors R10 to R13 and a reference voltage D1.

In the voltage detection circuit 110 of the embodiment, the comparator 111 detects a status when the voltage of the cell BAT1 becomes the cell balance detection voltage. An output from the charge terminate delay circuit 112 is supplied to an input of the NOR circuit 220. When the voltage of the cell BAT1 reaches the cell balance detection voltage, the charge terminate delay circuit 112 outputs a charge terminate signal that terminates charging of the battery pack including the cell BAT1 after being delayed for a predetermined period. The charge terminate signal is supplied to the gate of the transistor for controlling charging MCOUT via the level shift circuit 230 to switch off the transistor for controlling charging MCOUT to terminate charging of the battery pack.

The memory circuit 113 stores the cell BAT1 when the cell BAT1 reaches the cell balance detection voltage first among the plural cells. An output from the memory circuit 113 is supplied to one of the inputs of the AND circuit 116. A charging cycle signal indicating starting of a next charging operation is input to the other of the inputs of the AND circuit 116. An output of the AND circuit 116 is supplied to the gate of the switch element M1. Here, the charging cycle signal may be provided from the outside of the semiconductor integrated circuit 200. Further, the switch element M1 of the embodiment is a MOS transistor.

In the voltage detection circuit 110 of the embodiment, the resistor R10 and the resistor R11 are connected in series between the cathode and the anode of the cell BAT1. Similarly, the resistor R12 and the resistor R13 are connected in series between the cathode and the anode of the cell BAT1.

The comparator 111 is configured such that a non-inverting input terminal (positive input terminal) is connected to a connecting point of the resistor R10 and the resistor R11, while an inverting input terminal (negative input terminal) is connected to the reference voltage D1 and detects whether the voltage of the cell BAT1 reaches the cell balance detection voltage. The reference voltage D1 is connected to the anode of the cell BAT1. An output of the comparator 111 is supplied to the charge terminate delay circuit 112 and the memory circuit 113.

The charge terminate delay circuit 112 outputs the charge terminate signal that terminates charging of the cells included in the battery pack after being delayed for the predetermined period when the comparator 111 detects that the voltage of the cell BAT1 reaches the cell balance detection voltage. The charge terminate signal is supplied to the gate of the transistor for controlling charging MCOUT via the NOR circuit 220 and the level shift circuit 230 to switch off the transistor for controlling charging MCOUT for terminating charging of the battery pack.

The memory circuit 113 may be composed of a flip-flop circuit or the like, for example. The memory circuit 113 of the embodiment is configured such that an output from the comparator 111 is supplied to the D terminal, and to output a signal from the Q terminal. An output from the NOR circuit 220 is supplied to the CL terminal of the memory circuit 113 via the INV circuit 221.

The comparator 114 is configured such that a positive input terminal is connected to a connecting point of the resistor R12 and the resistor R13, while a negative input terminal is connected to the reference voltage D1 and detects over-discharge of the cell BAT1.

An output of the over-discharge delay circuit 115 is supplied to an input of the AND circuit 210 so that a discharge terminate signal is output that terminates discharging of the cells included in the battery pack after being delayed for the predetermined period when the comparator 114 detects over-discharge. The discharge terminate signal is supplied to the gate of the transistor for controlling discharging MDOUT to switch off the transistor for controlling discharging MDOUT for terminating discharging from the battery pack.

Figure 5:
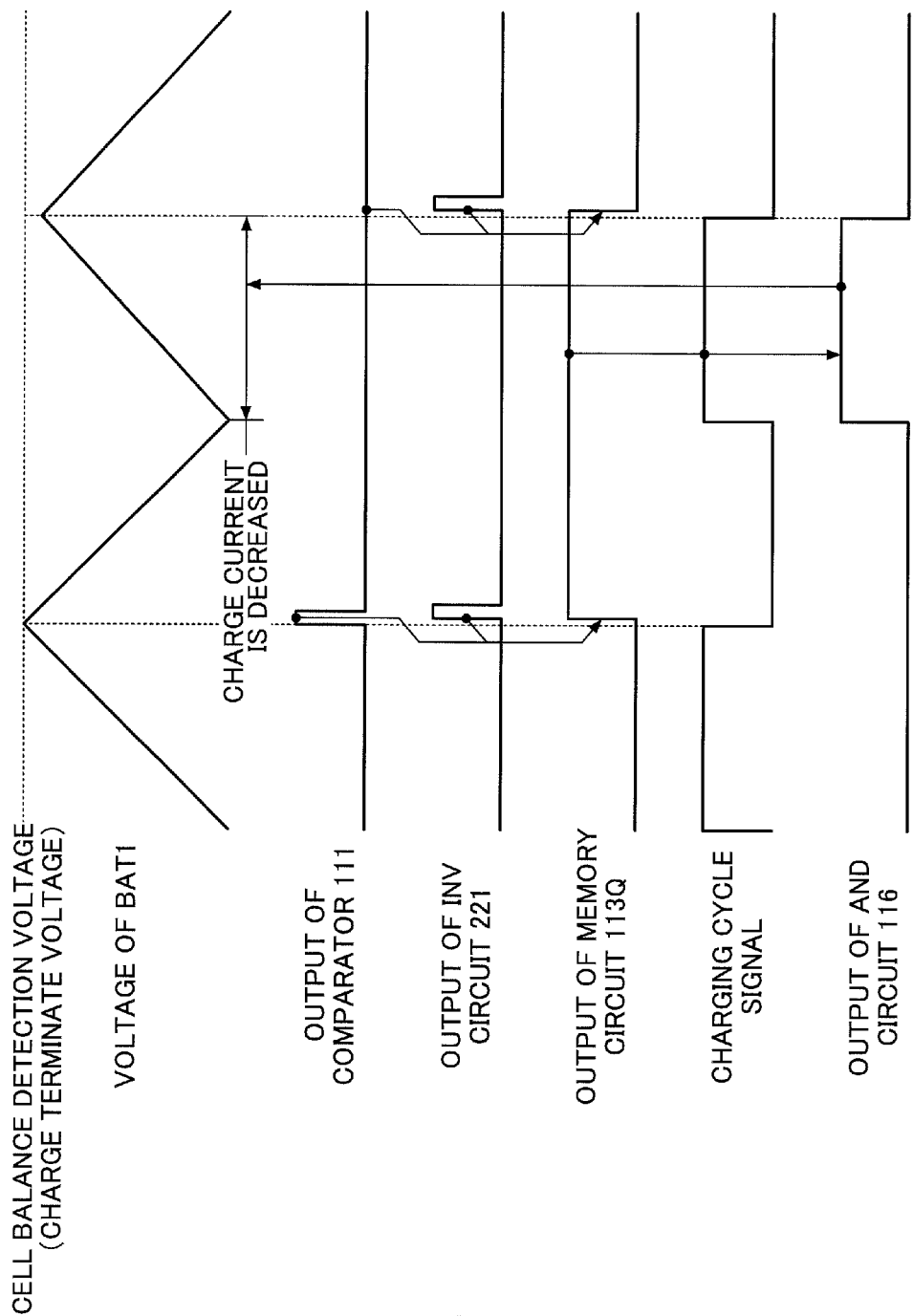
FIG. 5 is a diagram for explaining an operation of the charge-discharge control circuit of the first embodiment.

Next, an operation of the voltage detection circuits 110 and 130 of the embodiment is explained. In the following description, it is assumed that the voltage of the cell BAT1 reaches the cell balance detection voltage first in the battery pack including the cell BAT1 and the cell BAT2. FIG. 5 is a diagram for explaining the operation of the charge-discharge control circuit of the first embodiment.

When the charging cycle signal is at a high level (hereinafter, referred to as "H level"), the cell BAT1 is charged so that the voltage of the cell BAT1 increases. Then, when the voltage of the cell BAT1 reaches the cell balance detection voltage, an output of the comparator 111 becomes H level from low level (hereinafter, referred to as "L level"). The signal of H level is input to the charge terminate delay circuit 112 and the memory circuit 113.

The charge terminate delay circuit 112 outputs a signal of H level after a predetermined delay time has passed. The signal of H level output from the charge terminate delay circuit 112 is input to the NOR circuit 220. Then, an output from the NOR circuit 220 becomes L level.

The output from the NOR circuit 220 is input to a clock terminal (CL terminal) of the memory circuit 113 and a clock terminal (CL terminal) of a memory circuit 133 (see FIG. 9) of the voltage detection circuit 130 via the INV circuit 221. In the memory circuit 113, the signal of H level from the comparator 111 is input to the D terminal. Thus, an output from the Q terminal of the memory circuit 113 is set as H level by a rising edge of the CL terminal.

While an output of the memory circuit 113 is H level, when the voltage of the cell BAT1 reaches the cell balance detection voltage, charging of the battery pack including the cell BAT1 and the cell BAT2 is terminated. Therefore, the charging cycle signal becomes L level. Thus, an output of the AND circuit 116 is kept at L level so that the switch element M1 is kept being switched off. An output of the Q terminal of the memory circuit 133 is kept at H level until a next rising edge of the CL terminal, which is a clock terminal, of the memory circuit 133.

When the cell BAT1 is discharged, the charging cycle signal becomes H level to start the next charging operation of the cell BAT1. Thus, an output of the AND circuit 116 becomes H level so that the switch element M1 is switched on. The switch element M1 is kept ON until the charging cycle signal becomes L level.

When the switch element M1 is switched on, the charge current flowing through the cell BAT1 is divided to decrease, and a time necessary for charging the cell BAT1 becomes longer. Therefore, the likelihood that the cell BAT1 reaches the cell balance detection voltage first for two consecutive times becomes low.

Further, for the voltage detection circuit 130, the cell BAT2 does not reach the cell balance detection voltage at the timing when the cell BAT1 reaches the cell balance detection voltage. Thus, an output of the comparator 131 (see FIG. 9) of the voltage detection circuit 130 is L level at this time, and a signal of L level is input to the D terminal of the memory circuit 133. At this time, as a signal of H level is input to the CL terminal of the memory circuit 133, an output of the Q terminal of the memory circuit 133 is kept at L level. It means that an output of the AND circuit 136 (see FIG. 9) of the voltage detection circuit 130 is kept at L level and the switch element M2 of the bypass circuit 140 is kept OFF.

As described above, in this embodiment, the cell which reaches the cell balance detection voltage first is stored, and only the switch element of the bypass circuit which is connected to the cell stored in the memory circuit is switched on in the next charging operation to reduce a charge current of the corresponding cell.

In this embodiment, with this structure, it is possible to prevent a specific cell from continuously reaching the cell balance detection voltage, so that shortening of the lifetime of the battery pack because of the reduction of a capacity of the specific cell can be suppressed. Further, in this embodiment, since the switch element of the bypass circuit is switched off at the same time as discharging is started, the current to be supplied to the load is not consumed by the bypass circuit so that the electric charge stored in the cell can be effectively utilized.

Further in this embodiment, the cell balance is maintained by setting a cell balance detection voltage which is lower than the overcharge detection voltage, instead of providing two kinds of thresholds (the overcharge detection voltage and the cell balance detection voltage) as the conventional charge-discharge control circuit, so that the size of the circuits can be reduced. Specifically, the number of comparators and resistors can be reduced.

Further, although the charge-discharge control circuit 300 of the embodiment does not include the transistor for controlling charging MCOUT and the transistor for controlling discharging MDOUT, this is not limiting. The charge-discharge control circuit 300 of the embodiment may include the transistor for controlling charging MCOUT and the transistor for controlling discharging MDOUT.

Figure 6A:
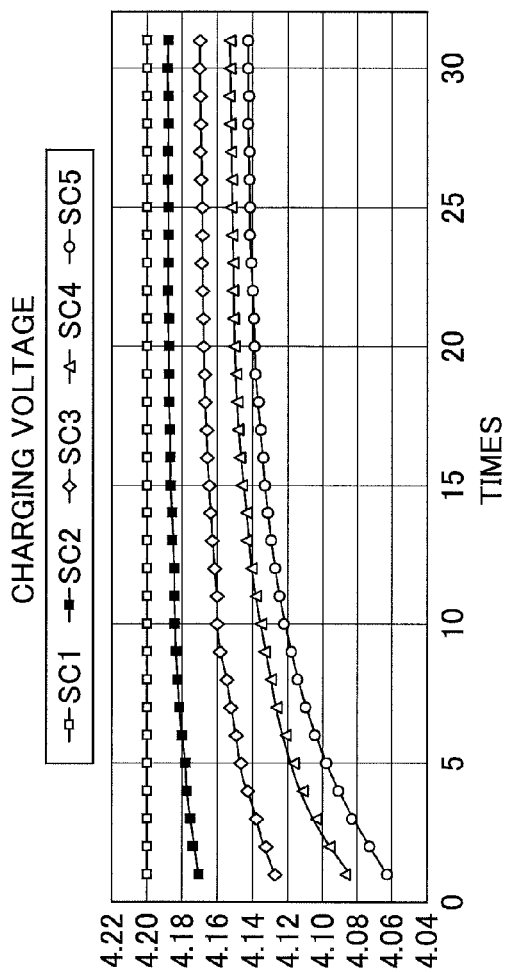
FIG. 6A is a first diagram that shows a result comparing the charge-discharge control circuit of the first embodiment and the conventional charge-discharge control circuit.
Figure 6B:
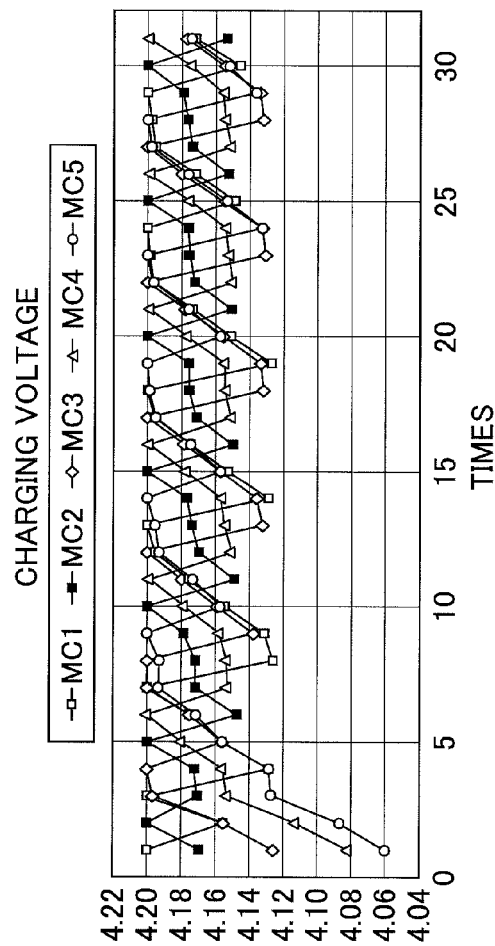
FIG. 6B is a second diagram that shows a result comparing the charge-discharge control circuit of the first embodiment and the conventional charge-discharge control circuit.

The effect of the embodiment is explained with reference to FIG. 6A to FIG. 8. FIG. 6A is a first diagram that shows a result comparing the charge-discharge control circuit of the first embodiment and the conventional charge-discharge control circuit. FIG. 6A shows a result of a simulation in which charging and discharging are performed for 31 cycles to a battery pack including five cells (SC1 to SC5) while providing a conventional charge-discharge control circuit. FIG. 6B is a second diagram that shows a result comparing the charge-discharge control circuit of the first embodiment and the conventional charge-discharge control circuit. FIG. 6B shows a result of a simulation in which cycles of charging and discharging are performed for 31 cycles to a battery pack including five cells (SC1 to SC5) while providing the charge-discharge control circuit of the embodiment. For examples shown in FIG. 6A and FIG. 6B, the initial voltage of each of the cells was 2.70 V, and the variation range of charging capacity was set to be ±5%.

For the example shown in FIG. 6A, although the voltage difference between cells decreases in accordance with the number of times of charging, the voltage differences do not change after the 15th charging. Further, it can be understood that the cell SC1, whose battery capacity is the smallest among the five cells, always reaches the cell balance detection voltage first. Thus, only the cell SC1 is deteriorated to shorten the lifetime of the battery pack.

Compared with this case, for the case shown in FIG. 6B, the cell that reaches the cell balance detection voltage first is changed, and the likelihood that the same cell continuously reaches the cell balance detection voltage first is low. Therefore, a specific cell is not deteriorated so as to extend the lifetime of the battery pack. Further, for the case shown in FIG. 6B, the charging voltages of the five cells MC1 to MC5 become almost the same at 5th charging, and it is revealed that the voltage difference between cells can be rapidly decreased.

FIG. 7 is a diagram in which charging time and discharging time of the conventional charge-discharge control circuit and charging time and discharging time of the charge-discharge control circuit of the first embodiment are compared.

For the conventional charge-discharge control circuit, currents discharged from the cells are flowing through the bypass circuits at discharging in order to decrease the voltage difference between cells.

On the other hand, for the charge-discharge control circuit of the embodiment, currents to the bypass circuits are shut down at the same time as discharging starts and all of the currents discharged from the cells are supplied to the load. Therefore, the voltage for charging in the cells is efficiently utilized.

Figure 8:
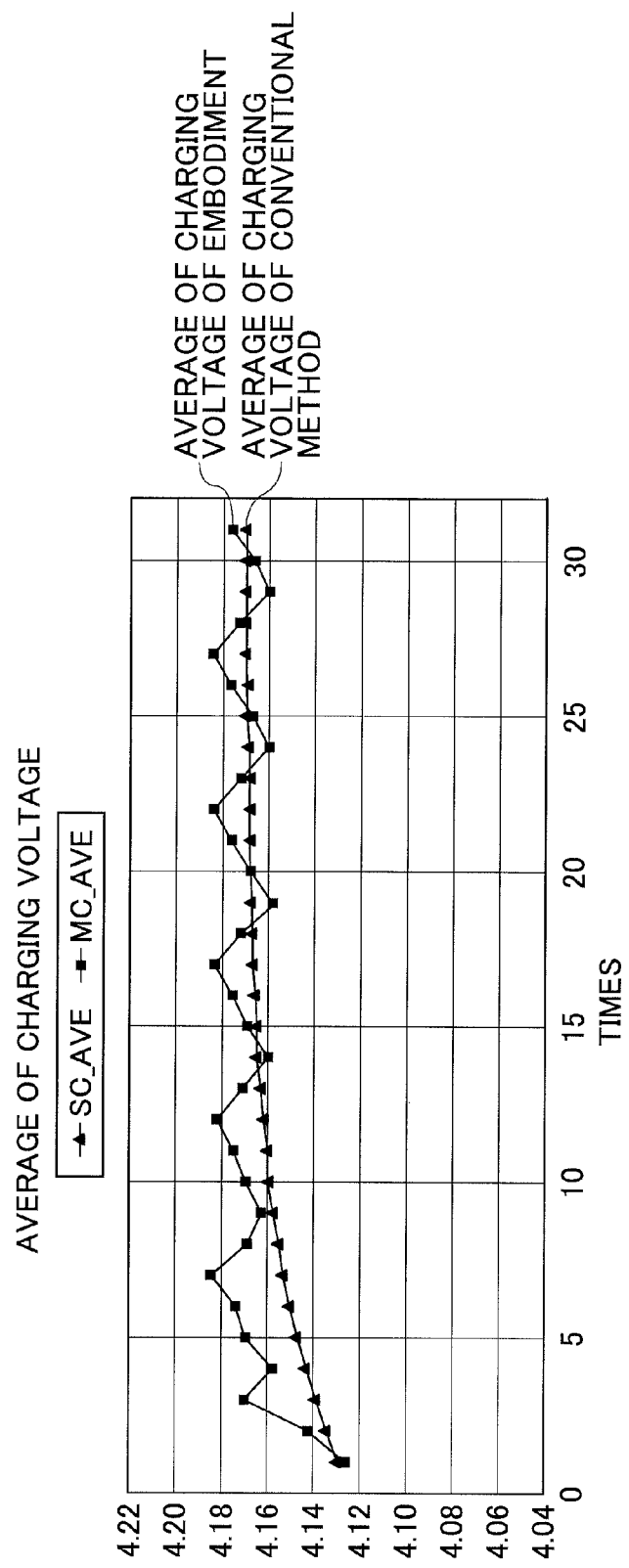
FIG. 8 is a diagram in which an average voltage value of the cells of the conventional charge-discharge control circuit and an average voltage value of the cells of the charge-discharge control circuit of the first embodiment are compared.

FIG. 8 is a diagram in which an average voltage value of the cells of the conventional charge-discharge control circuit and an average voltage value of the cells of the charge-discharge control circuit of the first embodiment are compared.

From FIG. 8, it can be understood that the average voltage of the cells by the charge-discharge control circuit of the embodiment can be converged within a predetermined range more rapidly than the average voltage of the cells by the conventional charge-discharge control circuit. Therefore, it can be understood that the difference in potential of the cells by the charge-discharge control circuit of the embodiment is more rapidly decreased than the difference in potential of the cells by the conventional charge-discharge control circuit.

Further, although in this embodiment, an example where the bypass circuits 120, 140 and 160 are provided outside the semiconductor integrated circuit 200 is explained, this is not limited so.

In this embodiment, only the switch element of the bypass circuit which is connected to the cell which has reached the cell balance detection voltage first in the previous charging operation is switched on in the current charging operation. Therefore, in this embodiment, heat generation because of switching on the switch element can be suppressed compared with the conventional charge-discharge control circuit in which all of the switch elements of the bypass circuits provided for the cells may be switched on.

Therefore, in this embodiment, the bypass circuits 120, 140 and 160 may be provided inside the semiconductor integrated circuit 200.

Figure 9:
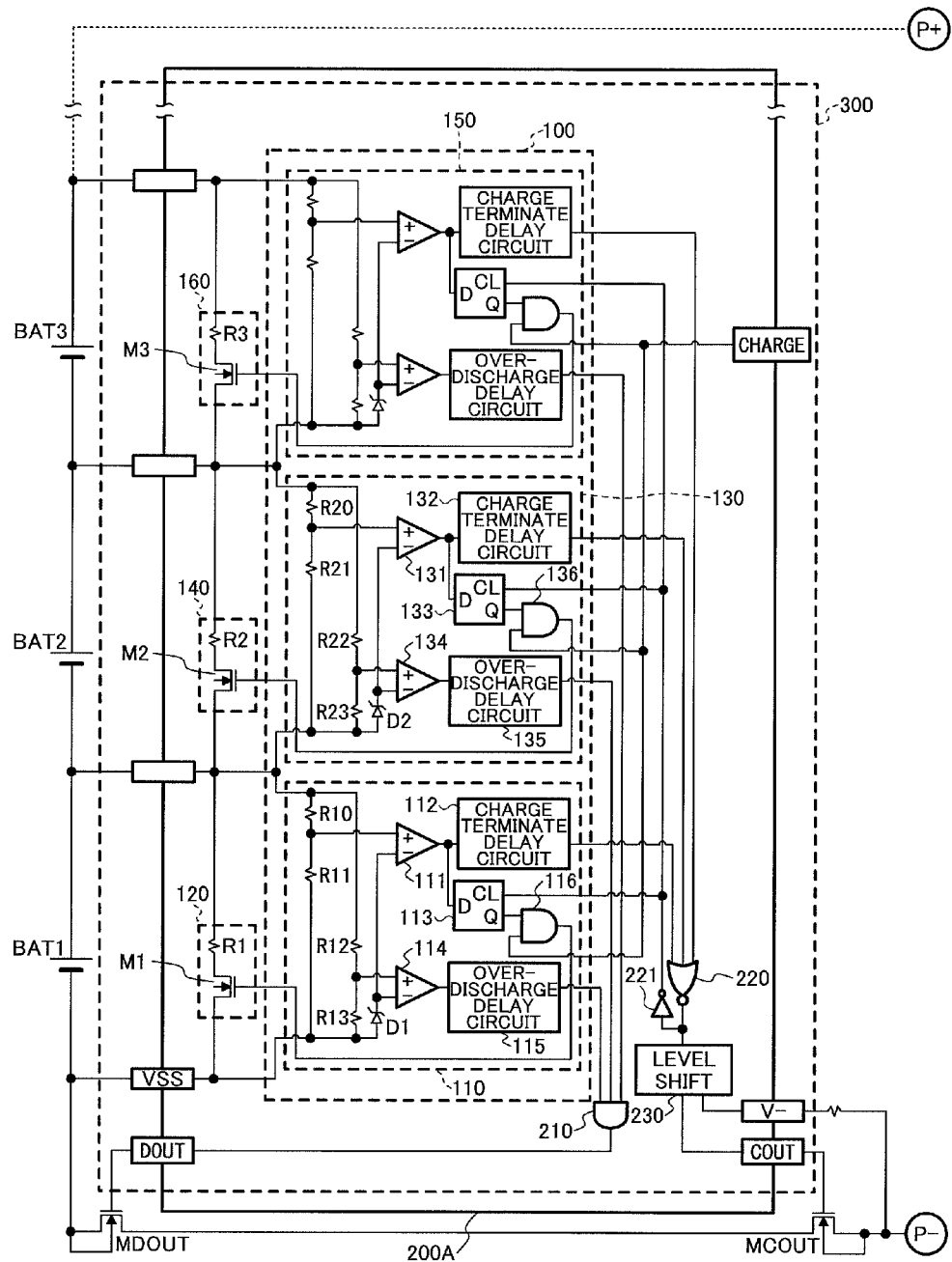
FIG. 9 is a diagram for explaining an example in which bypass circuits are included inside an IC.

FIG. 9 is a diagram for explaining an example in which the bypass circuits are provided inside the semiconductor integrated circuit.

On a semiconductor integrated circuit 200A shown in FIG. 9, the bypass circuits 120, 140 and 160 are mounted in addition to the circuits mounted on the semiconductor integrated circuit 200.

By mounting the bypass circuits 120, 140 and 160 on the semiconductor integrated circuit 200A, the size of the battery pack including the semiconductor integrated circuit 200A can be reduced to reduce the cost.

Second Embodiment

The second embodiment is described with reference to drawings. In the second embodiment, detection whether the cells reach the cell balance detection voltage is prevented except for the cell that reaches the cell balance detection voltage first.

In this embodiment, as the bypass circuit connected to the cell which has reached the cell balance detection voltage first is switched on in the next charging operation to reduce the charge current, it can be suppressed that the same cell continuously reaches the cell balance detection voltage first. Further in this embodiment, as the detection whether the cells, other than the cell which reaches the cell balance detection voltage first, reach the cell balance detection voltage is prevented, the bypass current only flows through one of the bypass circuits in the charging operation. Therefore, the current consumed as the bypass current can be reduced.

Figure 10:
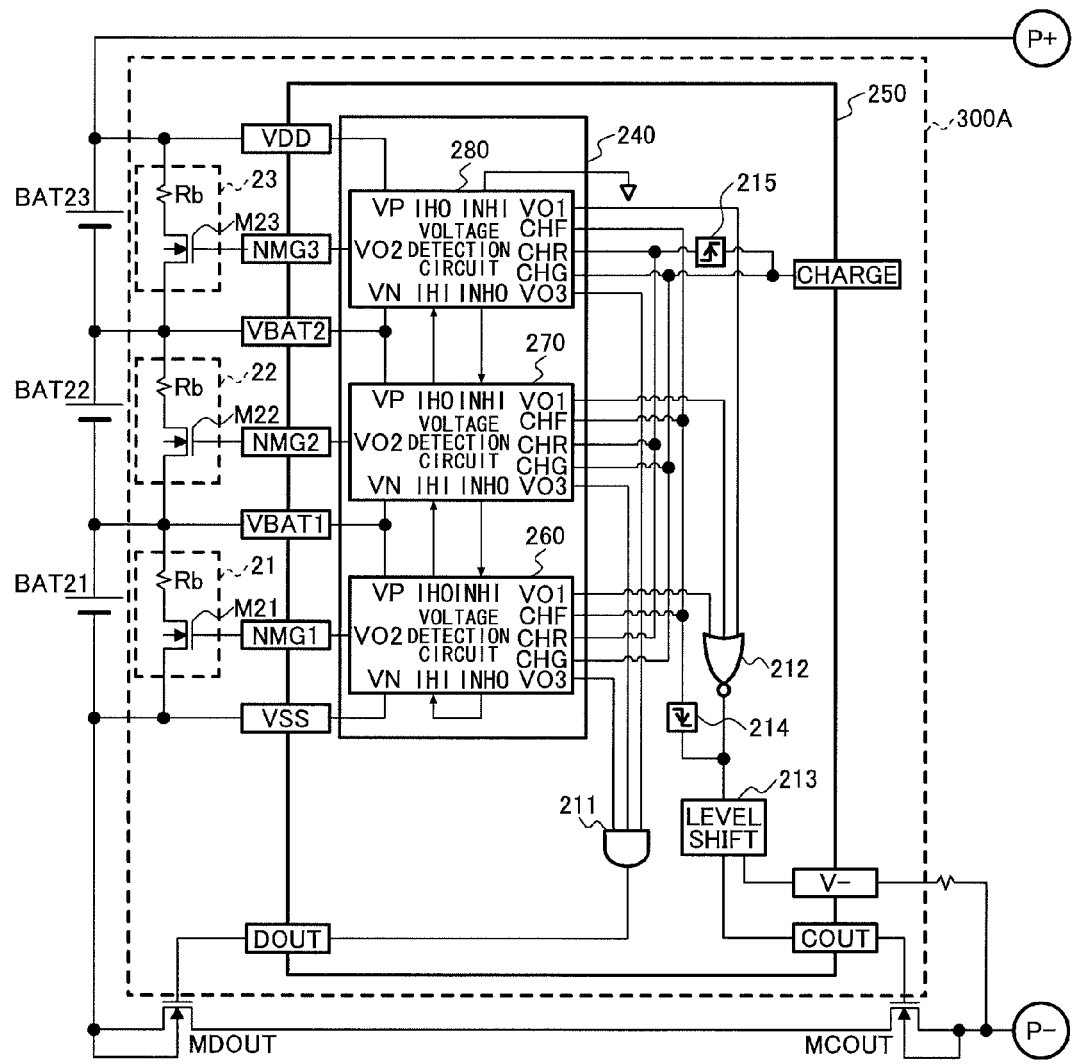
FIG. 10 is a diagram for explaining a charge-discharge control circuit of a second embodiment.

A charge-discharge control circuit 300A of the embodiment is explained in the following with reference to FIG. 10. FIG. 10 is a diagram for explaining the charge-discharge control circuit of the second embodiment.

The charge-discharge control circuit 300A of the embodiment controls charging and discharging of the plural cells. FIG. 10 shows an example in which charging and discharging of plural cells is controlled by a single charge-discharge control circuit 300A.

The charge-discharge control circuit 300A of the embodiment includes a voltage detection circuit 240, bypass circuits 21, 22 and 23, an AND circuit 211, a NOR circuit 212, a level shift circuit 213, a falling edge generator 214, and a rising edge generator 215. The voltage detection circuit 240 includes voltage detection circuits 260, 270 and 280. For the charge-discharge control circuit 300A of the embodiment, the circuits other than the bypass circuits 21, 22 and 23, in other words, the voltage detection circuit 240, the AND circuit 211, the NOR circuit 212, the level shift circuit 213, the falling edge generator 214 and the rising edge generator 215 are mounted on the semiconductor integrated circuit 250.

In this embodiment, the voltage detection circuit 260 is connected to the bypass circuit 21. The bypass circuit 21 is composed of a resistor Rb and a switch element M21 which are connected in series, and is connected with a cell BAT21 in parallel. The voltage detection circuit 270 is connected to the bypass circuit 22. The bypass circuit 22 is composed of a resistor Rb and a switch element M22 which are connected in series, and is connected with a cell BAT22 in parallel. The voltage detection circuit 280 is connected to the bypass circuit 23. The bypass circuit 23 is composed of a resistor Rb and a switch element M23 which are connected in series, and is connected with a cell BAT23 in parallel.

Figure 11:
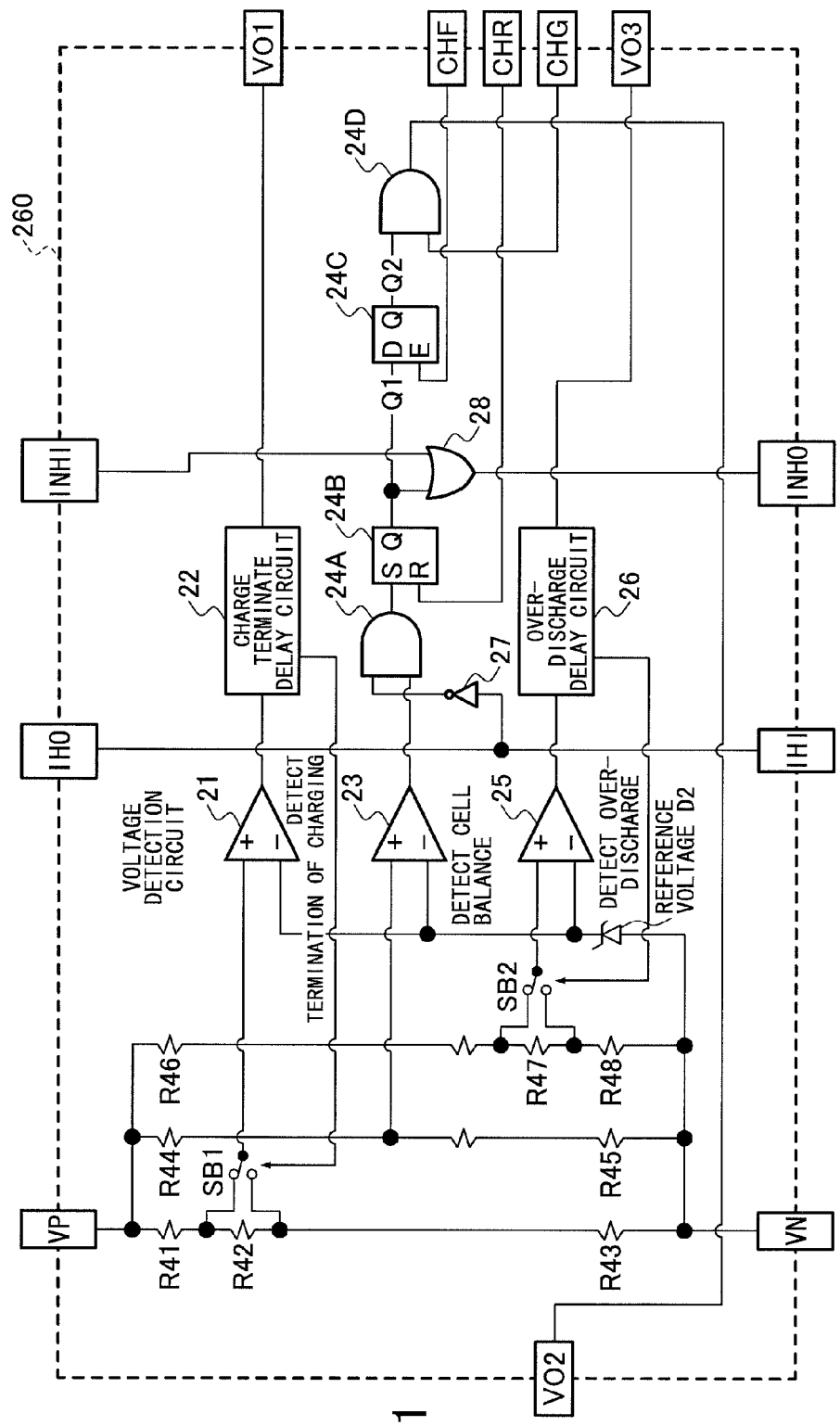
FIG. 11 is a diagram for explaining a voltage detection circuit of the second embodiment.

The voltage detection circuits 260, 270 and 280 of the embodiment are explained with reference to FIG. 11. In this embodiment, the voltage detection circuits 260, 270 and 280 have the same structure, respectively. Therefore, in the following of the embodiment, only the voltage detection circuit 260 is explained as an example. FIG. 11 is a diagram for explaining the voltage detection circuit of the second embodiment.

In the voltage detection circuit 260 shown in FIG. 11, when the voltage of the cell BAT21 reaches the cell balance detection voltage, the cell BAT21 is stored in the memory circuit 24B and at the same time, functions of other voltage detection circuits 270 and 280 for detecting the cell balance detection voltage of the cells BAT22 and BAT 23 are prevented. It means that the voltage detection circuits 270 and 280 are made not to detect that the cell BAT22 and the cell BAT23 reach the cell balance detection voltage, respectively. Further, for the voltage detection circuit 260 shown in FIG. 11, when the voltage detection circuit 270 or the voltage detection circuit 280 detects that the cell BAT22 or the cell BAT23 reaches the cell balance detection voltage, the function for detecting that the cell BAT21 reaches the cell balance detection voltage is prevented.

The voltage detection circuit 260 includes comparators 21, 23 and 25, a charge terminate delay circuit 22, an over-discharge delay circuit 26, AND circuits 24A and 24D, memory circuits 24B and 24C, an inverter circuit 27, an OR circuit 28, resistors R41 to R48, switches SB1 and SB2, and a reference voltage D2.

In the voltage detection circuit 260, the comparator 21 detects that the voltage of the cell BAT21 becomes the charge terminate voltage, and supplies the detected result to the charge terminate delay circuit 22. When the voltage of the cell BAT21 reaches the charge terminate voltage, the charge terminate delay circuit 22 outputs a charge terminate signal that terminates charging of the battery pack including the cell BAT21 after being delayed for the predetermined period. An output of the charge terminate delay circuit 22 is supplied to an input of the NOR circuit 212 via the VO1 terminal. Then, the charge terminate signal is supplied to the gate of the transistor for controlling charging MCOUT via the level shift circuit 213 to switch off the transistor for controlling charging MCOUT for terminating charging to the battery pack.

The comparator 23 detects that the voltage of the cell BAT21 becomes the cell balance detection voltage.

The memory circuits 24B and 24C store the cell BAT21 when the voltage of the cell BAT21 becomes the cell balance detection voltage first among the plural cells. The AND circuit 24A, the inverter circuit 27 and the OR circuit 28 cause the other voltage detection circuits (in this embodiment, the voltage detection circuit 270 and the voltage detection circuit 280) not to detect that the voltages of the other cells (in this embodiment, the cell BAT22 and the cell BAT23) reach the cell balance detection voltage when the voltage of the cell BAT21 reaches the charge terminate voltage first among the plural cells. The cell balance detection voltage of the embodiment is lower than the charge terminate voltage, and is previously set. The comparator 25 and the over-discharge delay circuit 26 are the same as those explained in the first embodiment.

Further, the voltage detection circuit 260 of the embodiment includes a VP terminal, a VN terminal, an INHI terminal, an INHO terminal, an IHI terminal, an IHO terminal, a VO1 terminal, a VO2 terminal, a VO3 terminal, a CHR terminal, a CHF terminal and a CHG terminal. The VP terminal is connected to the cathode of the cell BAT21 via a VBAT1 terminal of the semiconductor integrated circuit 250. The VN terminal is connected to the anode of the cell BAT21 via a VSS terminal of the semiconductor integrated circuit 250.

A signal output from the INHO terminal of other voltage detection circuit is input to the INHI terminal. A signal output from the INHO terminal of the voltage detection circuit 270 is input to the INHI terminal of the voltage detection circuit 260. A signal output from the INHO terminal of the voltage detection circuit 280 is input to the INHI terminal of the voltage detection circuit 270.

An output signal of the OR circuit 28 is output from the INHO terminal. Further, an output Q1 of the memory circuit 24B is supplied to one of the inputs of the OR circuit 28, while a signal input from the INHI terminal is input to the other input of the OR circuit 28. The voltage detection circuit 260 of the embodiment is positioned at the lowest in the voltage detection circuit 240 and functions as a protection IC that controls the transistor for controlling charging MCOUT that controls charging and the transistor for controlling discharging MDOUT that controls discharging. Therefore, at the voltage detection circuit 260, an output of the INHO terminal is supplied to the IHI terminal.

A signal that prevents storing the cell BAT21 in the memory circuit 24B is input to the IHI terminal. When a signal of H level is input from the IHI terminal, the memory circuit 24B is prevented from storing the cell BAT21.

The IHO terminal supplies a signal input to the IHI terminal to another voltage detection circuit. The signal output from the IHO terminal of the voltage detection circuit 260 is supplied to the IHI terminal of the voltage detection circuit 270. The signal output from the IHO terminal of the voltage detection circuit 270 is supplied to the IHI terminal of the voltage detection circuit 280. Here, as the voltage detection circuit 260 is positioned at the lowest in the voltage detection circuit 240, the signal output from the INHO terminal of the voltage detection circuit 260 is input to the IHI terminal of the voltage detection circuit 260.

The VO1 terminal outputs a signal indicating that the cell BAT21 reaches the charge terminate voltage. In this embodiment, when it is detected that the cell BAT21 reaches the charge terminate voltage, the VO1 terminal outputs a signal of H level. The VO2 terminal outputs a control signal that controls the switch element M21 of the bypass circuit 21. The control signal output from the VO2 terminal is supplied to the gate of the switch element M21 via a NMG1 terminal of the semiconductor integrated circuit 250 to control ON/OFF of the switch element M21. The VO3 terminal outputs a signal indicating that the cell BAT21 becomes over-discharged. In this embodiment, when the over-discharge is detected, the VO3 terminal outputs a signal of L level.

A pulse signal indicating that a connection of a battery charger is detected is input to the CHR terminal. A signal indicating that termination of charging is detected is input to the CHF terminal. A signal that the battery charger is connected is input to the CHG terminal.

Figure 12:
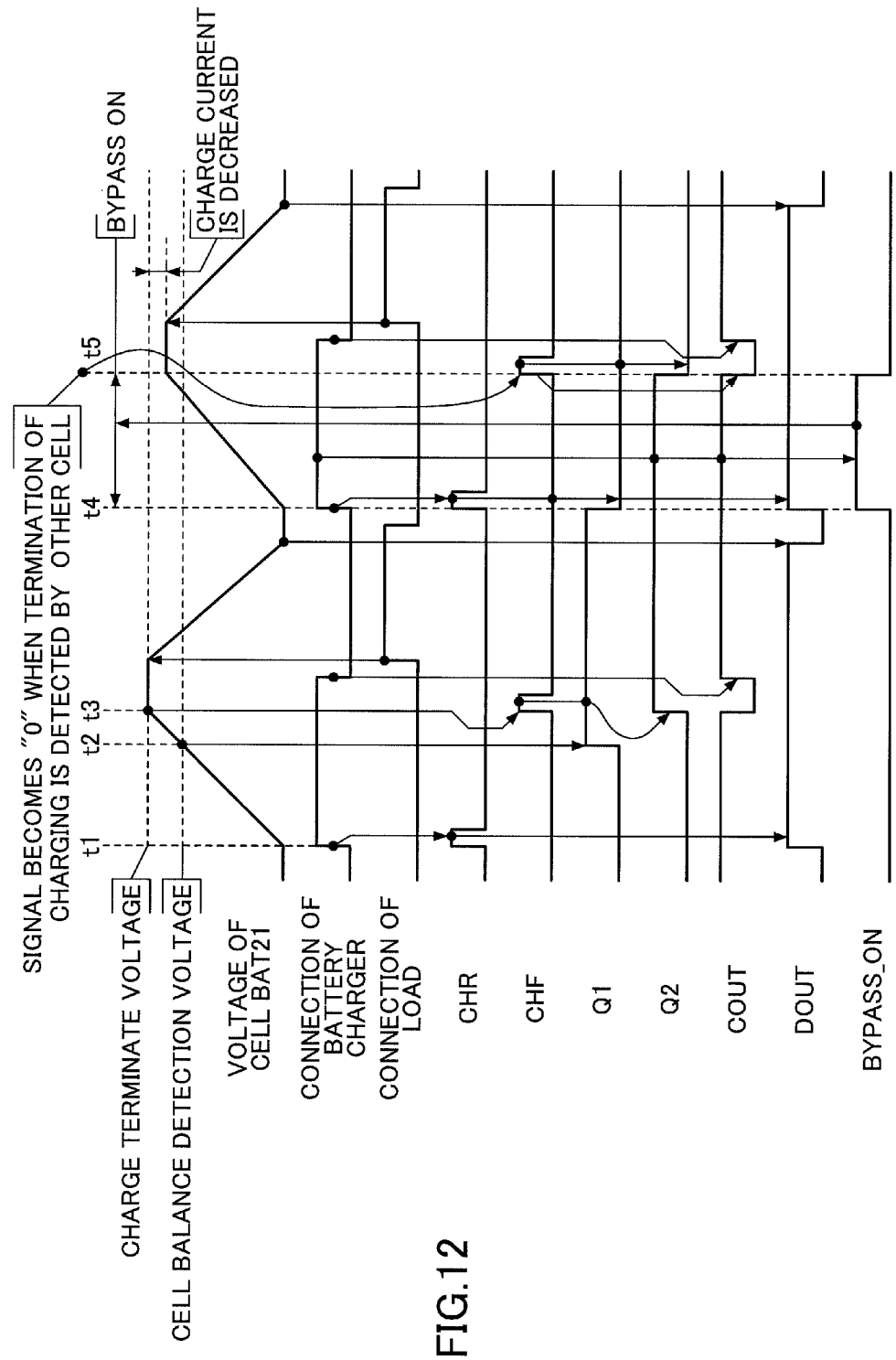
FIG. 12 is a timing chart for explaining an operation of the voltage detection circuit of the second embodiment.

The operation of the voltage detection circuit 260 of the embodiment is explained with reference to FIG. 12. FIG. 12 is a timing chart for explaining the operation of the voltage detection circuit of the second embodiment. FIG. 12 shows the operation of the voltage detection circuit 260 where the cell BAT21 reaches the cell balance detection voltage first among the cells BAT21 to BAT23.

When a battery charger is connected to the battery pack including the charge-discharge control circuit 300A at the timing t1 in FIG. 12, a battery charger connection detection signal indicating that the battery charger connection is detected is input in the CHARGE terminal of the charge-discharge control circuit 300A. The rising edge generator 215 generates a pulse signal based on the battery charger connection detection signal. The generated pulse signal is input to the CHR terminal of the voltage detection circuit 260, and resets the memory circuits 24B (SR latch) of the voltage detection circuits (voltage detection circuits 260, 270 and 280) so that the INHO terminals of the voltage detection circuits reach L level. As the signal of L level is supplied to the IHI terminal of each of the voltage detection circuits, an output of the inverter circuit 27 becomes H level so that an output of the AND circuit 24A becomes a status in which the cell balance detection result is capable of being stored in the memory circuit 24B (SR latch).

When the voltage of the cell BAT21 reaches the cell balance detection voltage by the charging operation at the timing t2, the comparator 23 of the voltage detection circuit 260 detects the status to output a signal of H level. The inputs of the AND circuit 24A become H level so that the S input of the memory circuit 24B becomes H level and the output Q1 of the memory circuit 24B is set at H level. With this, the INHO terminal of the voltage detection circuit 260 reaches H level, and the signals of H level are supplied to the IHI terminals of the other voltage detection circuits 270 and 280. Therefore, the outputs of the inverter circuits 27 of the other voltage detection circuits 270 and 280 become L level, and the outputs of the comparators 23 are prevented by the AND circuits 24A so that the S inputs of the memory circuits 24B are fixed at L level, respectively. At this time, only the output Q1 of the memory circuits 24B of the voltage detection circuit 260 is H level, and the outputs Q1 of the memory circuit 24B of the other voltage detection circuits 270 and 280 are L level.

The output Q1 of the memory circuit 24B is maintained at H level until the timing t4 at which the next charging operation is started. When the next charging operation is started means that a pulse signal indicating that the battery charger is connected again is input from the CHR terminal after the cell BAT21 reaches the charge terminate voltage and once the charging is terminated.

When the cell BAT21 reaches the charge terminate voltage at the timing t3, the comparator 21 detects this status and outputs a signal of H level indicating that the cell BAT21 becomes termination of charging from the VO1 terminal via the charge terminate delay circuit 22. The signal is supplied to an input of the NOR circuit 212. An output of the NOR circuit 212 reaches L level when the signal of H level is input.

In this embodiment, the falling edge generator 214 detects this falling of the signal of L level to generate a pulse signal. The generated pulse signal is input to the memory circuit 24C via the CHF terminal at the timing t3. When the pulse signal is supplied from the CHF terminal, the memory circuit 24C becomes enabled such that the output Q1 of the memory circuit 24B is transferred to the memory circuit 24C. Then, the output of the memory circuit 24C becomes H level at the timing t3. The output of the memory circuit 24C is maintained at H level until the timing t5 at which the pulse signal is supplied via the CHF terminal.

Here, the output Q2 of the memory circuit 24C is input to one of the inputs of the AND circuit 24D. A signal input from the CHG terminal is input to the other input of the AND circuit 24D. The signal input from the CHG terminal becomes H level while charging is performed. Therefore, the output of the AND circuit 24D is H level between the timing t4 and the timing t5. The output of the AND circuit 24D is supplied to the gate of the switch element M21 via the VO2 terminal. In this embodiment, when the output of the AND circuit 24D is H level, the switch element M21 is switched on and a bypass current flows through the bypass circuit 21.

Thus, at the bypass circuit 21, the switch element M21 is kept ON from the timing t4 at which the next charging cycle is started to the timing t5 at which the charging cycle is terminated so that the bypass current flows though the bypass circuit 21. With this, the charge current for the cell BAT21 decreases from the timing t4 to the timing t5. Thus, the cell BAT21 does not reach the cell balance detection voltage first between the timing t4 and the timing t5.

Next, the operation of an example where the cell BAT22 or the cell BAT23, other than the cell BAT21, reaches the cell balance detection voltage first is explained with referring back to FIG. 11.

The operation of the voltage detection circuit 260 in which the cell BAT22 reaches the cell balance detection voltage first in the charge-discharge control circuit 300A is explained.

When the voltage of the cell BAT22 becomes the cell balance detection voltage in the voltage detection circuit 270, a signal of H level indicating that the cell BAT22 reaches the cell balance detection voltage is output from the INHO terminal of the voltage detection circuit 270. The signal output from the INHO terminal of the voltage detection circuit 270 is input to the INHI terminal of the voltage detection circuit 260.

As the signal of H level input to the INHI terminal of the voltage detection circuit 260 is supplied to one of the inputs of the OR circuit 28, the OR circuit 28 outputs the signal of H level. The output of the OR circuit 28 is input to the inverter 27 via the INHO terminal and the IHI terminal. The inverter 27 outputs a signal of L level. The signal of L level is supplied to one of the inputs of the AND circuit 24A.

When the signal of L level is input to one of the inputs of the AND circuit 24A, the output is fixed to L level regardless of the output by the comparator 23. Therefore, the status that the cell BAT21 reaches the cell balance detection voltage is not detected. Thus, the switch element M21 of the bypass circuit 21 is not switched on.

It means that in this embodiment, when one of the cells BAT21, BAT22 and BAT23 reaches the cell balance detection voltage first, only the cell that reaches the cell balance detection voltage first is stored. Then, in the next charging operation, the bypass current only flows through the bypass circuit connected to the stored cell to reduce the charge current of the stored cell.

Therefore in this embodiment, the bypass circuit through which the bypass current flows when charging is limited to one, so that the bypass current can be reduced to improve charging efficiency compared with the conventional method in which the bypass current flows through plural bypass circuits when charging. Further in this embodiment, as the charge current is reduced for only the cell which reaches the cell balance detection voltage first, it is prevented that the same cell reaches the cell balance detection voltage first two consecutive times. Thus, according to the embodiment, it can be suppressed that a specific cell is deteriorated so that the lifetime of the battery pack can be extended.

Third Embodiment

The third embodiment is described with reference to drawings. In the third embodiment, a point where a single charge-discharge control circuit controls charging and discharging of a single cell is different from the second embodiment. In the following explanation of the embodiment, only the different points from the second embodiment are explained.

Figure 13:
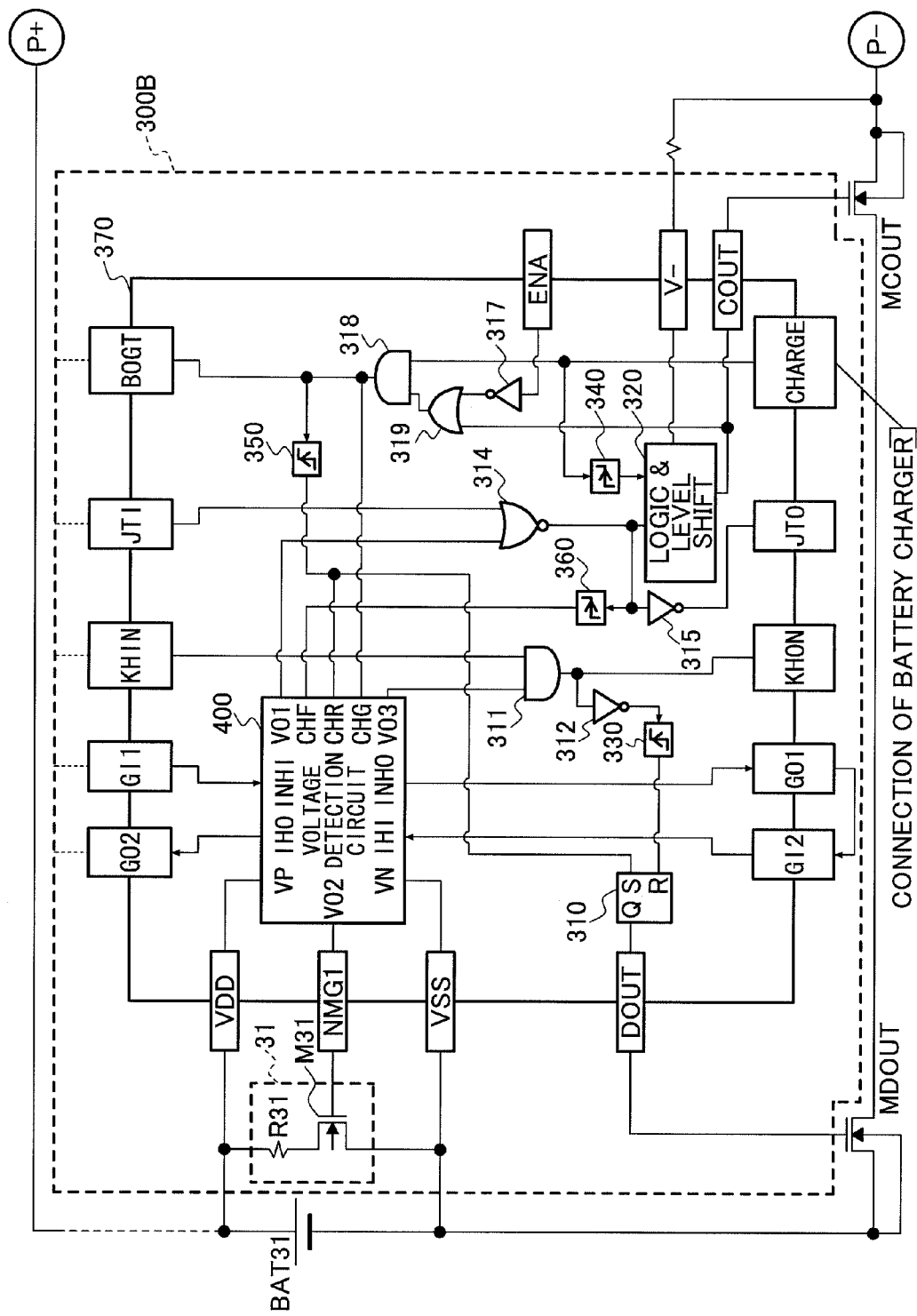
FIG. 13 is a diagram for explaining a charge-discharge control circuit of a third embodiment.

A charge-discharge control circuit 300B of the embodiment is explained with reference to FIG. 13. The charge-discharge control circuit 300B of the embodiment controls charging and discharging of a single cell. FIG. 13 is a diagram for explaining the charge-discharge control circuit of the third embodiment.

The charge-discharge control circuit 300B of the embodiment includes a bypass circuit 31, a voltage detection circuit 400, AND circuits 311 and 318, a NOR circuit 314, an OR circuit 319, inverters 312, 315 and 317, a memory circuit 310, rising edge generators 330 and 350, falling edge generators 340 and 360, and a logic and level shift circuit 320.

The bypass circuit 31 is composed of a resistor R31 and a switch element M31 which are connected in series, and is connected with a cell BAT31 in parallel. In the charge-discharge control circuit 300B, the circuits other than the bypass circuit 31 are mounted on a semiconductor integrated circuit 370.

The voltage detection circuit 400 of the embodiment has the same structure as the voltage detection circuits 260, 270 and 280 which are explained in the second embodiment, and the explanation is not repeated. Further, the logic circuits mounted on the semiconductor integrated circuit 370 of the embodiment other than the voltage detection circuit 400 are for controlling ON/OFF of the transistor for controlling charging MCOUT and the transistor for controlling discharging MDOUT.

The semiconductor integrated circuit 370 of the embodiment includes a VDD terminal, an NMG1 terminal, a VSS terminal, a DOUT terminal, a COUT terminal, a JTI terminal, a JTO terminal, a KHIN terminal, a KHON terminal, a GI1 terminal, a GO1 terminal, a GI2 terminal, a GO2 terminal, an ENA terminal, a CHARGE terminal a BOGT terminal, and a V-terminal.

The VDD terminal is connected to the cathode of the cell BAT31, and the VSS terminal is connected to the anode of the cell BAT31. The NMG1 terminal is connected to the gate of the switch element M31 of the bypass circuit 31. The DOUT terminal is connected to the gate of the transistor for controlling discharging MDOUT, and the COUT terminal is connected to the gate of the transistor for controlling charging MDOUT.

A charge termination detection signal indicating that termination of charging is detected is input to the JTI terminal when the other cell becomes the charge terminate voltage in the other voltage detection circuit, which will be explained later. In this embodiment, when termination of charging is detected, a signal of H level is input from the JTI terminal. The JTO terminal outputs a charge termination detection signal indicating that the voltage of the cell BAT31 becomes the charge terminate voltage in the voltage detection circuit 400. In this embodiment, when it is detected that the cell reaches the charge terminate voltage, a signal of H level is output from the JTO terminal.

An over-discharge detection signal indicating that the over-discharge is detected is input to the KHIN terminal when another cell becomes over-discharged in the respective other voltage detection circuit, which will be explained later. In this embodiment, when over-discharge is detected, a signal of L level is input to the KHIN terminal. The KHON terminal outputs an over-discharge detection signal indicating that the cell BAT31 becomes over-discharged in the voltage detection circuit 400. In this embodiment, when it is detected that the cell becomes over-discharge, a signal of L level is output from the KHON terminal.

The GI1 terminal is connected to the INHI terminal of the voltage detection circuit 400, and a cell balance detection signal is input when the other cell of the other voltage detection circuit, which will be explained later, reaches the cell balance detection voltage. In this embodiment, the input of the cell balance detection signal is prevented by the output Q1 from the voltage detection circuit which detects that the corresponding cell reaches the cell balance detection voltage first. The GO1 terminal outputs a cell balance detection signal indicating that the voltage of the cell BAT31 becomes the cell balance detection voltage in the voltage detection circuit 400.

A prevention signal indicating that the detection of the cell balance detection voltage of the cell BAT31 by the voltage detection circuit 400 is prevented is input to the GI2 terminal, when the voltage of the cell of the other voltage detection circuit, which will be explained later, becomes the cell balance detection voltage. The GO2 terminal outputs a prevention signal indicating that the detection of the cell balance detection voltage of the other cells is prevented when the cell BAT31 reaches the cell balance detection voltage first among the plural cells, which will be explained later.

A signal indicating whether the semiconductor integrated circuit 370 is the last one for controlling the transistor for controlling discharging MDOUT and the transistor for controlling charging MCOUT is input to the ENA terminal. In this embodiment, when the semiconductor integrated circuit 370 is the last one, a signal of H level is input.

A battery charger connection detection signal indicating that the connection of the battery charger is detected is input to the CHARGE terminal. The BOGT terminal transfers the battery charger connection detection signal to the other semiconductor integrated circuits. The V-terminal is connected to the anode of the load.

Here, in this embodiment, as the COUT terminal and the JTO terminal, or the DOUT terminal and the KHON terminal are not used at the same time, respectively, these may be actualized by common pins.

Figure 14:
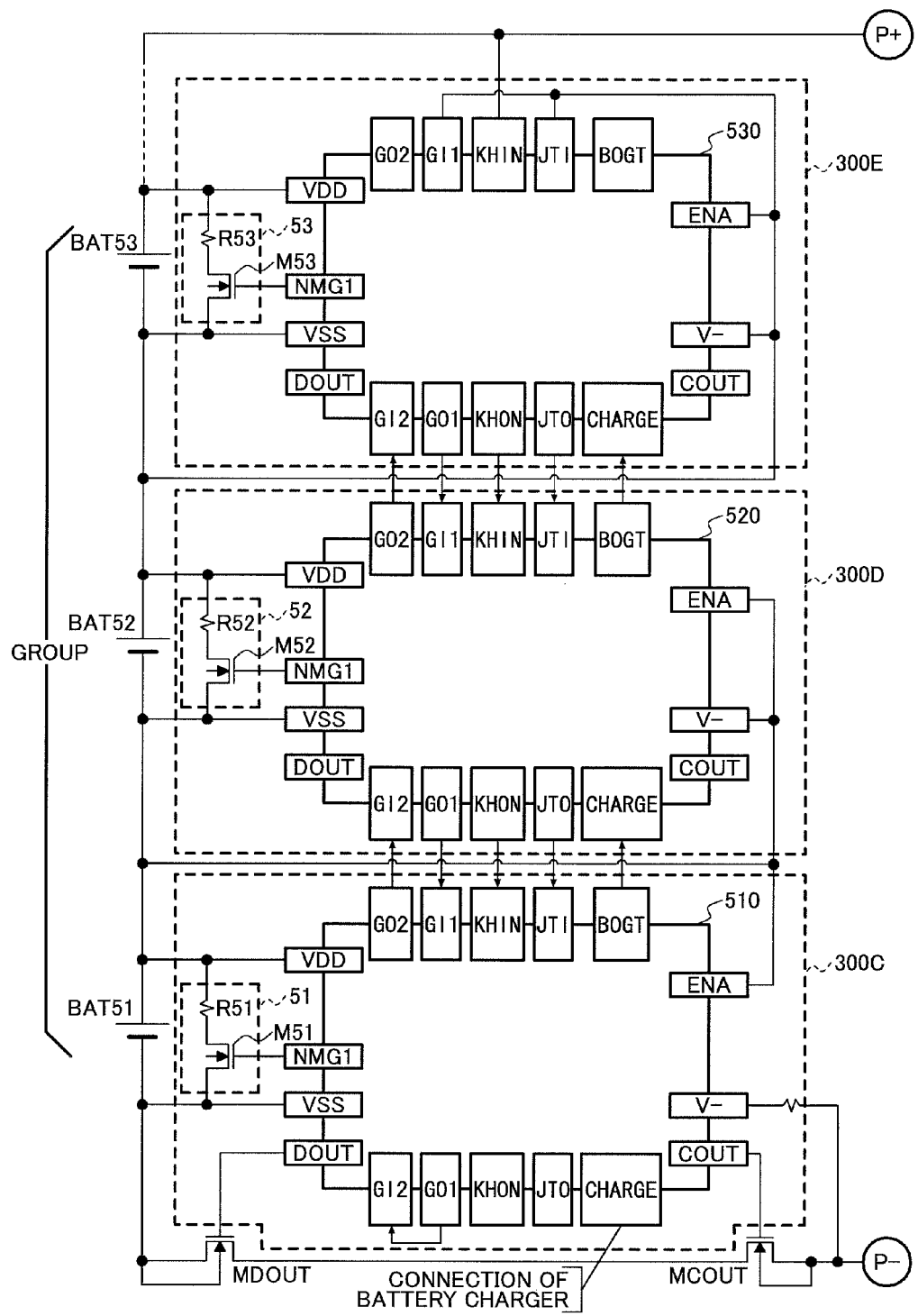
FIG. 14 is a diagram for explaining controlling charging and discharging of the plural cells using the charge-discharge control circuit of the third embodiment.

A case in which controlling charging and discharging of plural cells using plural charge-discharge control circuits each having the same structure as the charge-discharge control circuit 300B is explained in the following. FIG. 14 is a diagram for explaining controlling charging and discharging of the plural cells using the charge-discharge control circuit of the third embodiment.

In FIG. 14, charge-discharge control circuits 300C, 300D and 300E having the same structure as the charge-discharge control circuit 300B control charging and discharging of cells BAT51, BAT52 and BAT53, respectively. The charge-discharge control circuit 300C includes a semiconductor integrated circuit 510 and a bypass circuit 51 and controls charging and discharging of the cell BAT51. The bypass circuit 51 is composed of a resistor R51 and a switch element M51. The charge-discharge control circuit 300D includes a semiconductor integrated circuit 520 and a bypass circuit 52 and controls charging and discharging of the cell BAT52. The bypass circuit 52 is composed of a resistor R52 and a switch element M52. The charge-discharge control circuit 300E includes a semiconductor integrated circuit 530 and a bypass circuit 53 and controls charging and discharging of the cell BAT53. The bypass circuit 53 is composed of a resistor R53 and a switch element M53.

The semiconductor integrated circuits 510, 520 and 530 have the same structure as the semiconductor integrated circuit 370 shown in FIG. 13. In this embodiment, as the semiconductor integrated circuit 510 of the charge-discharge control circuit 300C is the last one for controlling the transistor for controlling discharging MDOUT and the transistor for controlling charging MCOUT, a signal of H level is input to the ENA terminal of the semiconductor integrated circuit 510.

For the example of FIG. 14, when the cell BAT51 reaches the cell balance detection voltage first, for example, the detection of the cell balance detection voltage for the cells BAT52 and BAT53 is prevented. Then, for the next charging operation of the current charging operation in which the cell BAT51 reaches the cell balance detection voltage first, the switch element M51 of the bypass circuit 51 is switched ON so that the bypass current flows therethrough.

Therefore, at this time the charge current flowing through the cell BAT51 decreases to prevent the cell BAT51 reaches the cell balance detection voltage two consecutive times. It means that in this embodiment, deterioration of a specific cell can be suppressed to extend the lifetime of the battery pack. Further, in this embodiment, the bypass circuit which is switched on while charging is only the bypass circuit 51. Thus, compared with the case where plural bypass circuits are switched on at the same time, the bypass current can be reduced to improve the charging efficiency.

Fourth Embodiment

The fourth embodiment is described with reference to drawings. In the fourth embodiment, plural charge-discharge control circuits each controlling charging and discharging of plural cells are provided. In the following explanation of the embodiment, only the different points from the second embodiment are explained.

Figure 15:
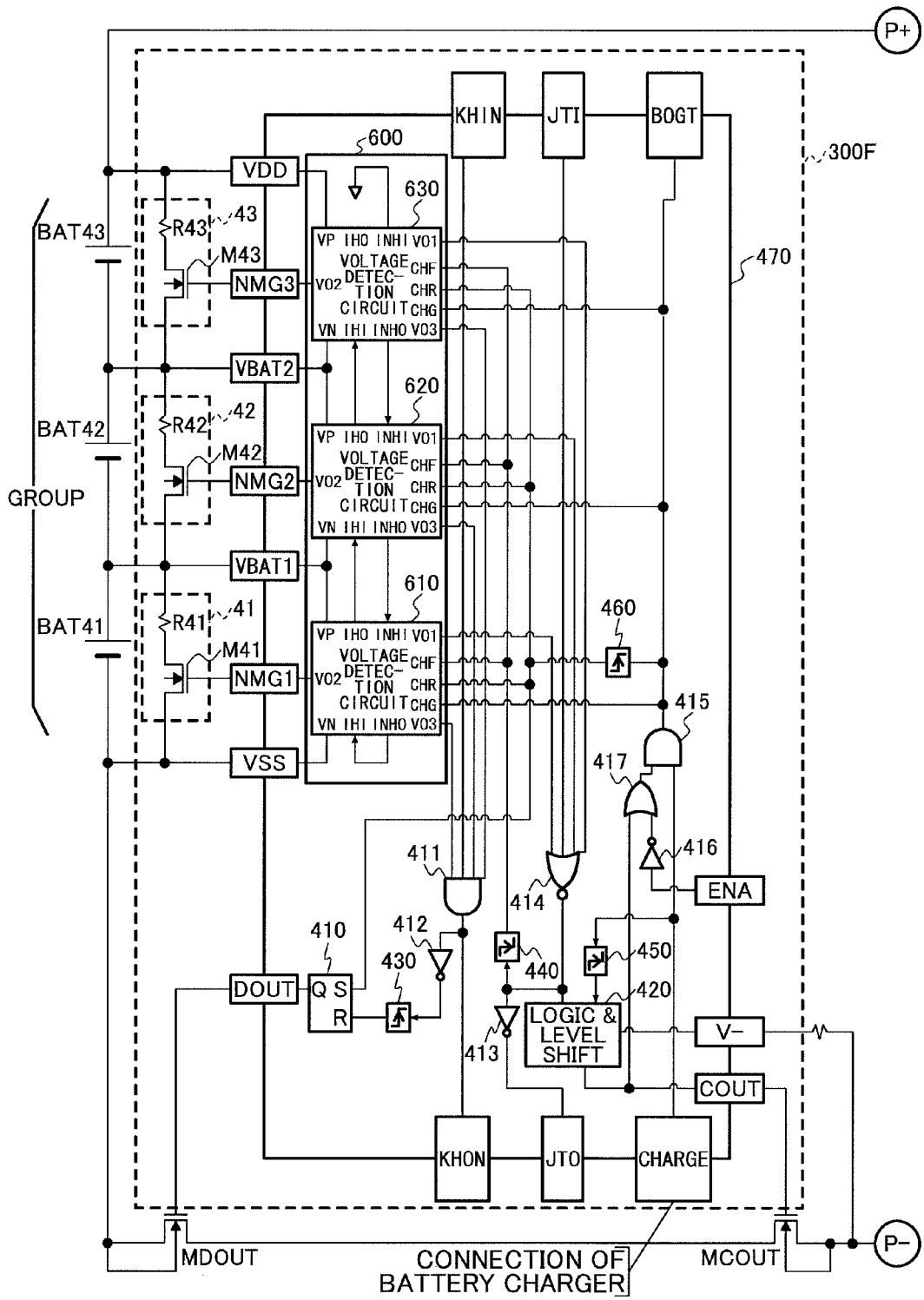
FIG. 15 is a diagram for explaining a charge-discharge control circuit of a fourth embodiment.

The charge-discharge control circuit 300F of the embodiment is explained with reference to FIG. 15. FIG. 15 is a diagram for explaining the charge-discharge control circuit of the fourth embodiment.

A charge-discharge control circuit 300F of the embodiment includes a voltage detection circuit 600, bypass circuits 41, 42 and 43, AND circuits 411 and 415, a NOR circuit 414, an OR circuit 417, inverters 412, 413 and 416, a memory circuit 410, rising edge generators 430 and 460, falling edge generators 440 and 450 and a logic and level shift circuit 420.

The voltage detection circuit 600 of the embodiment includes voltage detection circuits 610, 620 and 630. The voltage detection circuits 610, 620 and 630 have the same structure as the voltage detection circuit 260 explained in FIG. 11.

In the charge-discharge control circuit 300F of the embodiment, the circuits other than the bypass circuits 41, 42 and 43 are mounted on a semiconductor integrated circuit 470.

The voltage detection circuit 610 is connected to the bypass circuit 41. The bypass circuit 41 is composed of a resistor R41 and a switch element M41. The bypass circuit 41 is connected to the cell BAT41. The voltage detection circuit 620 is connected to the bypass circuit 42. The bypass circuit 42 is composed of a resistor R42 and a switch element M42. The bypass circuit 42 is connected to the cell BAT42. The voltage detection circuit 630 is connected to the bypass circuit 43. The bypass circuit 43 is composed of a resistor R43 and a switch element M43. The bypass circuit 43 is connected to the cell BAT43.

The logic circuits other than the voltage detection circuit 600 mounted on the semiconductor integrated circuit 470 of the embodiment are for controlling ON/OFF of the transistor for controlling charging MCOUT and the transistor for controlling discharging MDOUT.

The semiconductor integrated circuit 470 of the embodiment includes a VDD terminal, an NMG1 terminal, an NMG2 terminal, an NMG3 terminal, a VBAT1 terminal, a VBAT2 terminal, a VSS terminal, a DOUT terminal, a COUT terminal, a JTI terminal, a JTO terminal, a KHIN terminal, a KHON terminal, an ENA terminal, a CHARGE terminal, a BOGT terminal and a V-terminal. The NMG1 terminal is connected to the gate of the switch element M41 of the bypass circuit 41. The NMG2 terminal is connected to the gate of the switch element M42 of the bypass circuit 42. The NMG3 terminal is connected to the gate of the switch element M43 of the bypass circuit 43. The VBAT1 terminal is connected to a connecting point between the cell BAT41 and the cell BAT42. The VBAT2 terminal is connected to a connecting point between the cell BAT42 and the cell BAT43.

Figure 16:
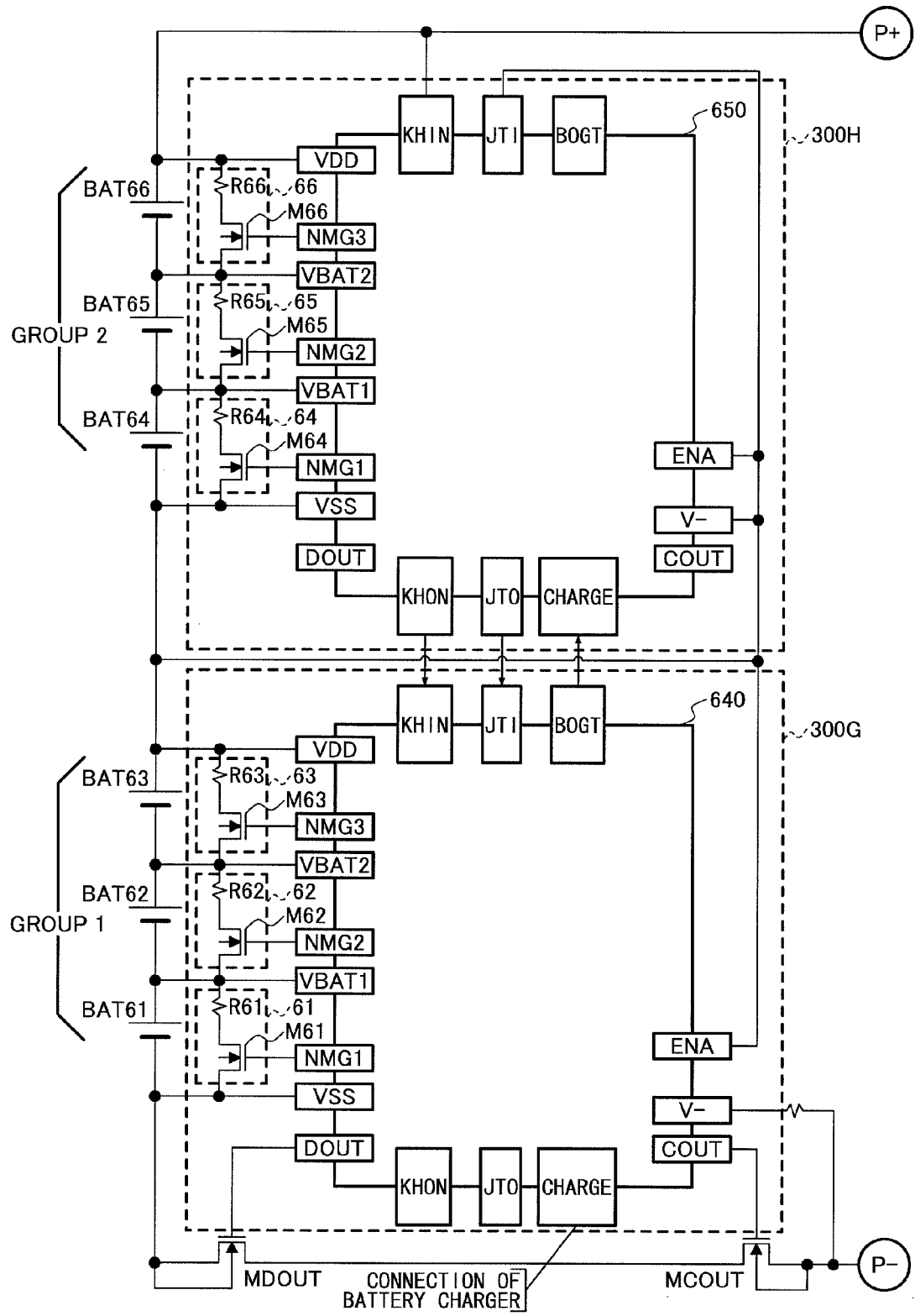
FIG. 16 is a diagram for explaining controlling charging and discharging of the charge-discharge control circuit of the fourth embodiment.

A case where plural of the charge-discharge control circuits of the embodiment are connected is explained in the following with reference to FIG. 16. FIG. 16 is a diagram for explaining controlling charging and discharging of the charge-discharge control circuit of the fourth embodiment.

In FIG. 16, charge-discharge control circuits 300G and 300H, having the same structure as the charge-discharge control circuit 300F, control charging and discharging of the cells BAT61 to BAT66. The charge-discharge control circuit 300G includes a semiconductor integrated circuit 640 and bypass circuits 61, 62 and 63, and controls charging and discharging of the cells BAT61, BAT62 and BAT63. The bypass circuit 61 is composed of a resistor R61 and a switch element M61, and is connected to the cell BAT61. The bypass circuit 62 is composed of a resistor R62 and a switch element M62, and is connected to the cell BAT62. The bypass circuit 63 is composed of a resistor R63 and a switch element M63, and is connected to the cell BAT63.

The charge-discharge control circuit 300H includes a semiconductor integrated circuit 650 and bypass circuits 64, 65 and 66, and controls charging and discharging of the cells BAT64, BAT65 and BAT66. The bypass circuit 64 is composed of a resistor R64 and a switch element M64, and is connected to the cell BAT64. The bypass circuit 65 is composed of a resistor R65 and a switch element M65, and is connected to the cell BAT65. The bypass circuit 66 is composed of a resistor R66 and a switch element M66, and is connected to the cell BAT66.

In this embodiment, as the semiconductor integrated circuit 640 of the charge-discharge control circuit 300G is the last one for controlling the transistor for controlling discharging MDOUT and the transistor for controlling charging MCOUT, a signal of H level is input to the ENA terminal of the semiconductor integrated circuit 640.

In this embodiment, the cells BAT61, BAT62 and BAT63 charging and discharging of which is controlled by the charge-discharge control circuit 300G, and the cells BAT64, BAT65 and BAT66 charging and discharging of which is controlled by the charge-discharge control circuit 300H are controlled as single groups, respectively.

The charge-discharge control circuit 300G of the embodiment stores a cell which reaches the cell balance detection voltage first among the cells BAT61, BAT62 and BAT63, and switches on the switch element of the bypass circuit connected to the stored cell in the next charging cycle. The charge-discharge control circuit 300H of the embodiment stores a cell which reaches the cell balance detection voltage first among the cells BAT64, BAT65 and BAT66, and switches on the switch element of the bypass circuit connected to the stored cell in the next charging cycle.

Therefore, in this embodiment, the number of bypass circuits which are switched on in loops is always one in each of the groups, so that the bypass current can be reduced to improve charging efficiency. Further, as the charge current of the cell which reaches the cell balance detection voltage first in each of the groups is reduced in the next charging cycle, it can be prevented that a specific cell continuously reaches the cell balance detection voltage first thereby to suppress the deterioration of the specific cell. Thus, the lifetime of the battery pack can be extended.

Fifth Embodiment

The fifth embodiment is described with reference to drawings. In the fifth embodiment, charging and discharging of plural cells is controlled by a microprocessor (MPU).

Figure 17:
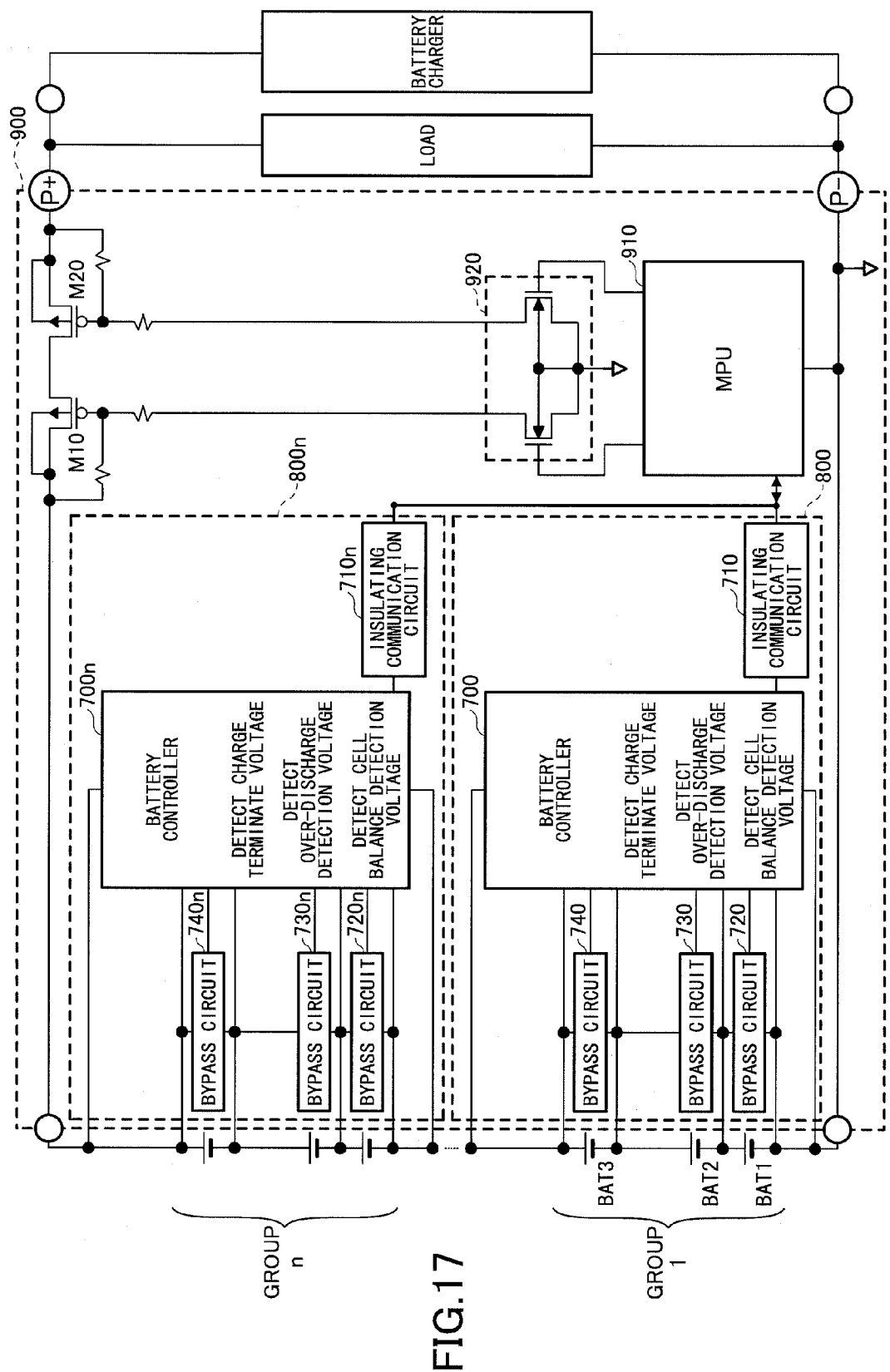
FIG. 17 is a diagram for explaining a charge-discharge control circuit of a fifth embodiment.

Charge-discharge control circuits 800 to 800n of the embodiment are explained with reference to FIG. 17. FIG. 17 is a diagram for explaining the charge-discharge control circuit of the fifth embodiment. The charge-discharge control circuits 800 to 800n of the embodiment control charging and discharging of cells based on a control signal from a MPU 910.

First, a protection module 900 including the charge-discharge control circuits 800 to 800n of the embodiment is explained. The protection module 900 of the embodiment includes the charge-discharge control circuits 800 to 800n, the MPU 910, a level shift circuit 920 and transistors M10 and M20.

The charge-discharge control circuits 800 to 800n of the embodiment control charging and discharging of plural cells which are divided into plural groups, based on the control signal from the MPU 910. The plural cells are divided into plural groups corresponding to the charge-discharge control circuits 800 to 800n. For example, when the protection module 900 is provided with "n" charge-discharge control circuits 800, the cells connected to the protection module 900 are divided into "n" groups. For the example shown in FIG. 17, three cells are set as one group, however, the number of cells included in each of the groups may be arbitrary set.

The charge-discharge control circuits 800 to 800n have the same structure, respectively. Therefore, in the following explanation, the charge-discharge control circuit 800 is explained as an example of the charge-discharge control circuits 800 to 800n. The charge-discharge control circuit 800 of the embodiment detects that the voltage of the cell reaches any of a charge terminate voltage, a cell balance detection voltage and an over-discharge detection voltage, and reports to the MPU 910. Further, the charge-discharge control circuit 800 of the embodiment controls ON/OFF of the switches of bypass circuits 720, 730 and 740, which will be explained later, based on the control signal from the MPU 910.

The MPU 910 outputs the control signal for having the switches of the bypass circuits ON/OFF to the charge-discharge control circuits 800 to 800n, based on the detection by the charge-discharge control circuits 800 to 800n. The operation of the MPU 910 will be explained later in detail.

The transistors M10 and M20 are switch elements for terminating charging and discharging of the cells. The level shift circuit 920 converts the voltage level of a signal output from the MPU 910 to a level capable of switching ON/OFF the transistors M10 and M20.

Next, the charge-discharge control circuit 800 of the embodiment is explained. The charge-discharge control circuit 800 of the embodiment includes a battery controller 700, an insulating communication circuit 710, and bypass circuits 720, 730 and 740. Cells BAT1, BAT2 and BAT3 are connected to the battery controller 700. The battery controller 700 detects voltages of the cells BAT1, BAT2 and BAT3. The battery controller 700 will be explained later in detail.

The insulating communication circuit 720 shifts a level of a signal so that the communication between the battery controller 700 and the MPU 910 becomes possible. The bypass circuit 720 is connected to the cell BAT1, and bypasses the current that flows through the cell BAT1 based on the signal from the battery controller 700. The bypass circuit 730 is connected to the cell BAT2, and bypasses the current that flows through the cell BAT2 based on the signal from the battery controller 700. The bypass circuit 730 is connected to the cell BAT3, and bypasses the current that flows through the cell BAT3 based on the signal from the battery controller 700.

Figure 18:
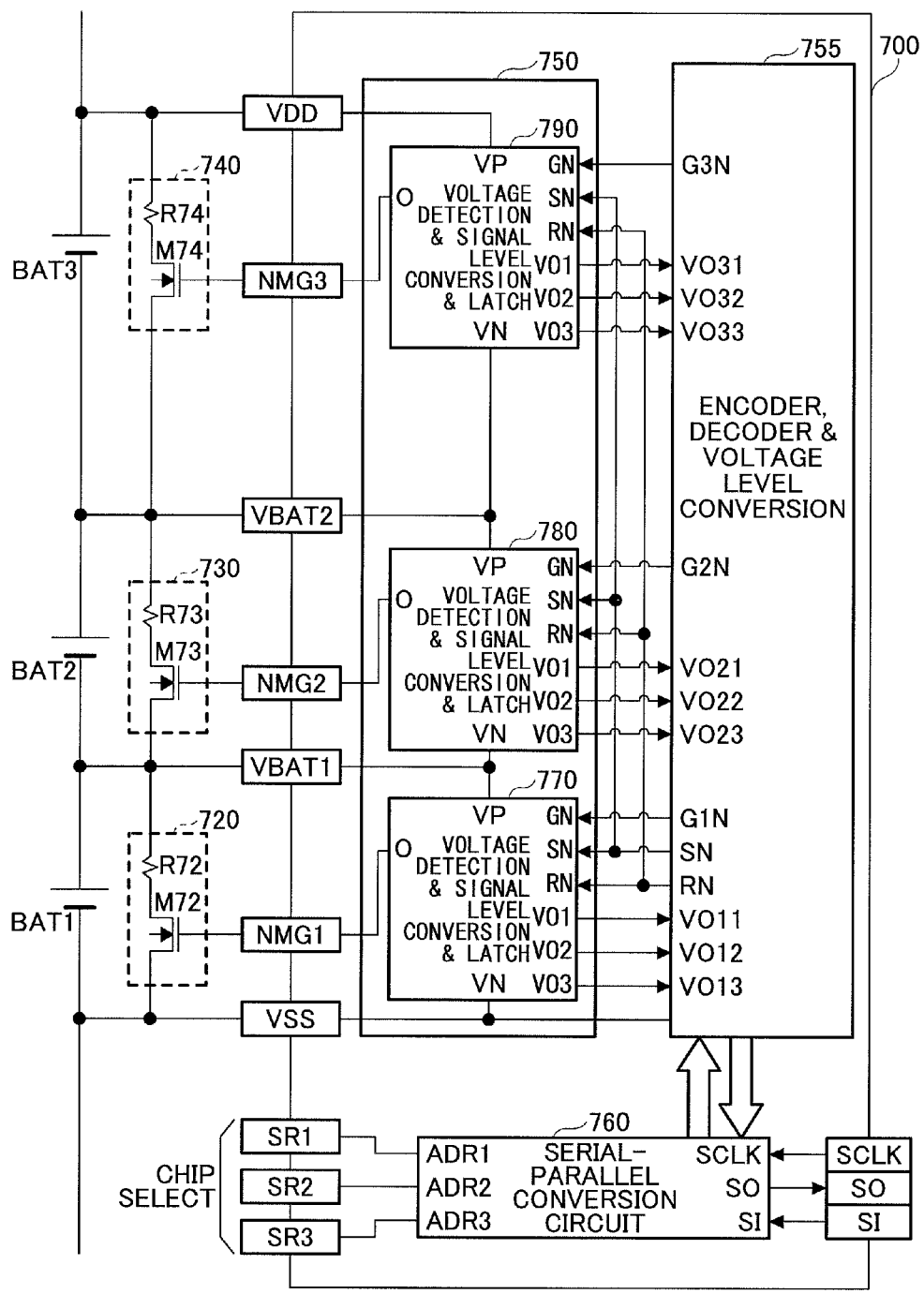
FIG. 18 is a diagram for explaining a battery controller of the fifth embodiment.

The battery controller 700 of the embodiment is explained with reference to FIG. 18. FIG. 18 is a diagram for explaining the battery controller of the fifth embodiment.

The battery controller 700 of the embodiment includes a voltage detection circuit 750, a voltage level conversion circuit 755, and a serial-parallel conversion circuit 760. The voltage detection circuit 750 includes a voltage detection circuit 770 that detects the voltage of the cell BAT1, a voltage detection circuit 780 that detects the voltage of the cell BAT2, and a voltage detection circuit 790 that detects the voltage of the cell BAT3. The voltage level conversion circuit 755 also has functions of an encoder and a decoder. The serial-parallel conversion circuit 760 converts parallel-in to serial-out, or serial-in to parallel-out, and sends and receives data to and from the MPU 910.

In this embodiment, as the structure of the voltage detection circuits 770, 780 and 790 are the same, the voltage detection circuit 770 is explained in the following as an example.

In the voltage detection circuit 770, a terminal VN is connected to the anode of the cell BAT1, and a terminal VP is connected to the cathode of the cell BAT1. In the voltage detection circuit 770, a terminal O is connected to the gate of a switch element M72 of the bypass circuit 720. The voltage detection circuit 770 outputs the detection result of the voltage of the cell BAT1 to the voltage level conversion circuit 755 from terminals VO1, VO2 and VO3. Further, the control signal from the MPU 910 is supplied to terminals GN, SN and RN of the voltage detection circuit 770 via the voltage level conversion circuit 755.

The voltage detection circuit 770 outputs a signal that determines ON/OFF of the switch element M72 to the bypass circuit 720 from the terminal O based on the control signal input from the terminals GN, SN and RN.

The bypass circuit 720 of the embodiment is composed of the switch element M72 and a resistor R72 which are connected in series and is connected with the cell BAT1 in parallel. The bypass circuits 730 and 740 have the same structure. It means that the bypass circuit 730 is composed of a switch element M73 and a resistor R73 which are connected in series and the bypass circuit 740 is composed of a switch element M74 and a resistor R74 which are connected in series.

Figure 19:
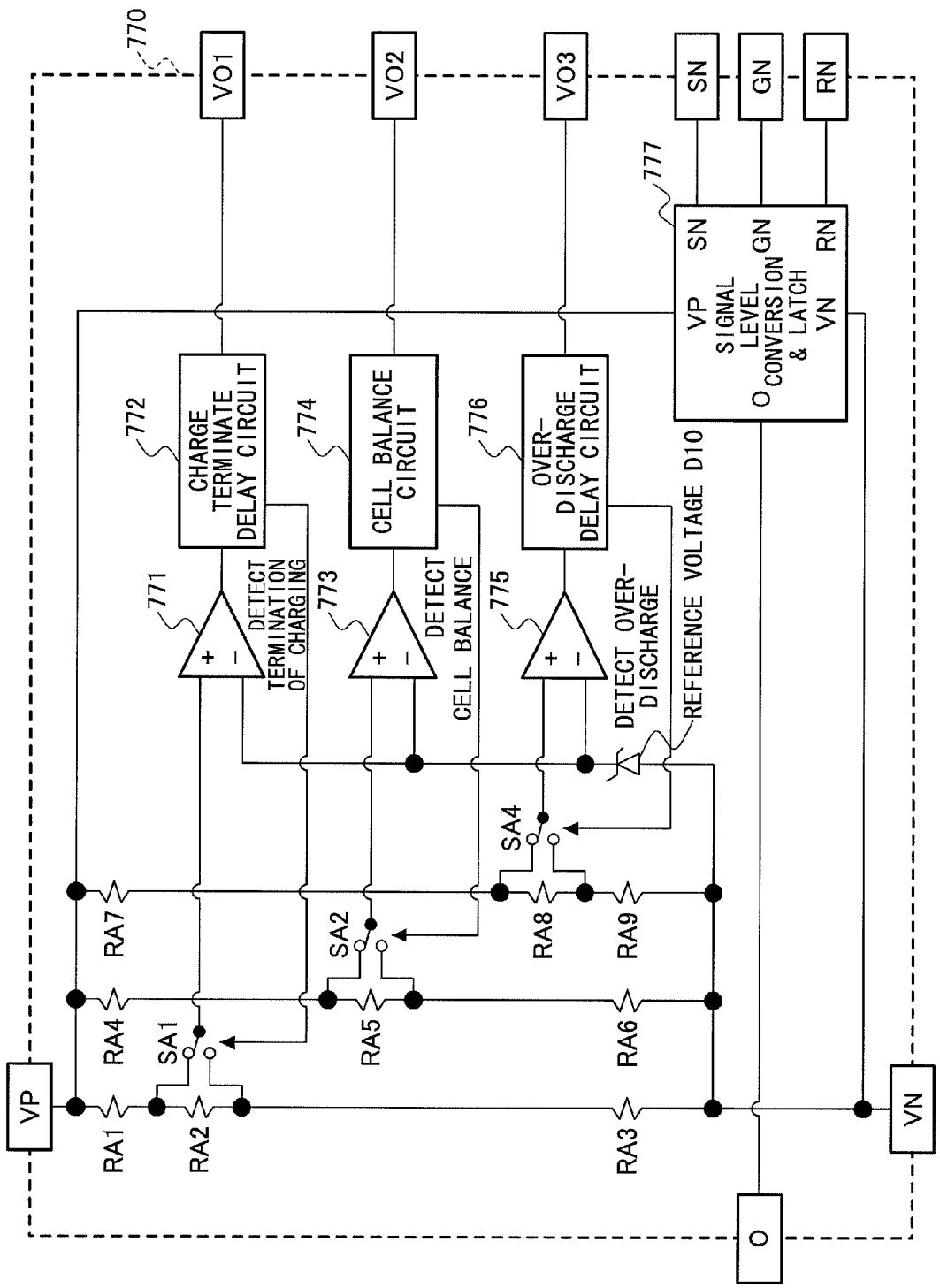
FIG. 19 is a diagram for explaining a voltage detection circuit of the fifth embodiment.

The voltage detection circuit 770 of the embodiment is explained with reference to FIG. 19. FIG. 19 is a diagram for explaining the voltage detection circuit of the fifth embodiment.

The voltage detection circuit 770 of the embodiment detects the charge terminate voltage, the cell balance detection voltage and the over-discharge detection voltage of the cell BAT1 and outputs the detected result. The voltage detection circuit 770 includes comparators 771, 773 and 775, a charge terminate delay circuit 772, a cell balance circuit 774, an over-discharge delay circuit 776, a level conversion circuit 777, resistors RA1 to RA9, switches SA1 to SA4, and a reference voltage D10. The resistors RA1 to RA9 and the switches SA1 to SA4 are used for setting the charge terminate voltage, the cell balance detection voltage and the over-discharge detection voltage.

The comparator 771 detects that the voltage of the cell BAT1 becomes the charge terminate voltage, and supplies the detected result to the charge terminate delay circuit 772. When the voltage of the cell BAT1 reaches the charge terminate voltage, the charge terminate delay circuit 772 outputs a charge terminate signal that terminates charging of the battery pack including the cell BAT1 to the voltage level conversion circuit 755 after being delayed for a predetermined period. The charge terminate signal is input to the terminal VO13 of the voltage level conversion circuit 755.

The comparator 773 detects that the voltage of the cell BAT1 becomes the cell balance detection voltage, and outputs the detected result to the cell balance circuit 774. The cell balance circuit 774 outputs the cell balance detection signal to the voltage level conversion circuit 755. The cell balance detection signal is input to the terminal VO12 of the voltage level conversion circuit 755.

The comparator 775 detects that the voltage of the cell BAT1 becomes the over-discharge detection voltage, and supplies the detected result to the over-discharge delay circuit 776. The over-discharge delay circuit 776 outputs a discharge terminate signal that terminates discharging from the battery pack including the cell BAT1 to the voltage level conversion circuit 755 after being delayed for the predetermined period. The discharge terminate signal is input to the terminal VO13 of the voltage level conversion circuit 755.

The level conversion circuit 777 converts a voltage level of the control signal which is sent from the MPU 910 via the voltage level conversion circuit 755, and outputs the control signal from the terminal O after being latched. The control signal output from the terminal O is output from the battery controller 700 to be supplied to the gate of the switch element M72 of the bypass circuit 720.

Figure 20:
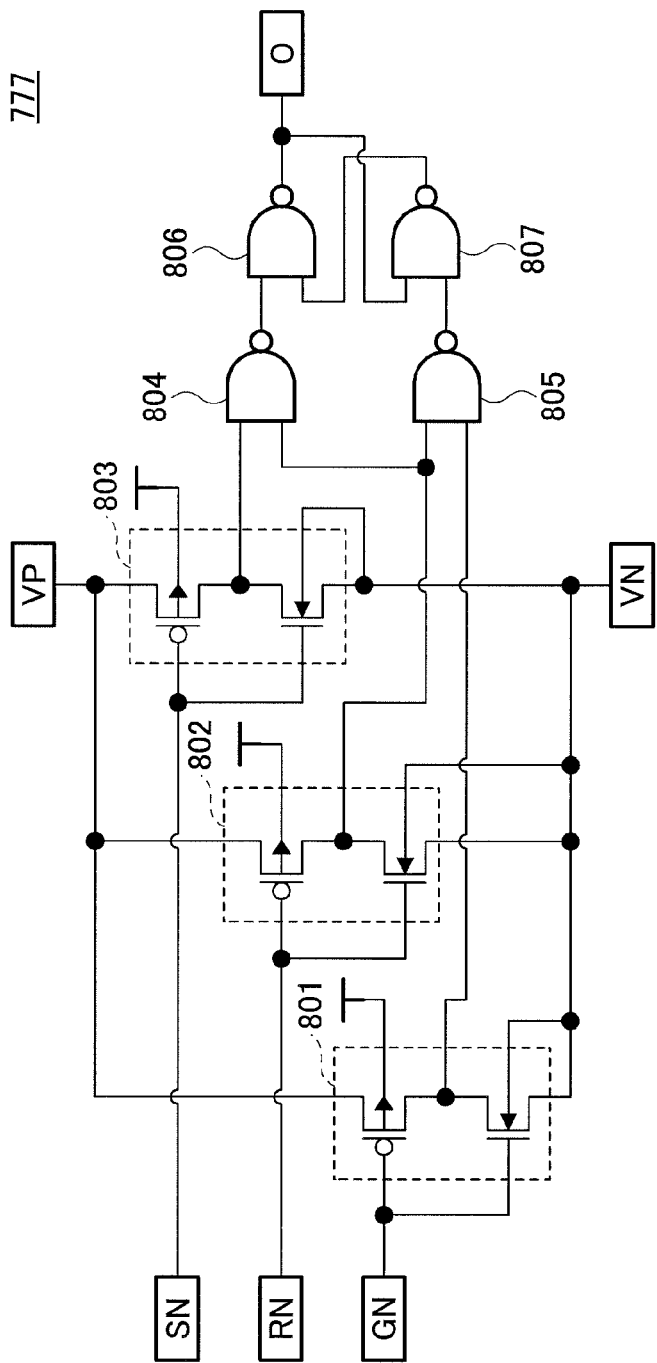
FIG. 20 is a diagram showing an example of a level conversion circuit of the fifth embodiment.

FIG. 20 is a diagram showing an example of the level conversion circuit of the fifth embodiment. A level conversion circuit 777 of the embodiment includes inverters 801, 802 and 803 respectively composed of a high voltage PMOS transistor and a high voltage NMOS transistor, and NAND circuits 804, 805, 806 and 807.

The level conversion circuit 777 of the embodiment converts the voltage level of the control signal from the MPU 910 from a voltage level between VDD-VSS, which is the power supply voltage of the protection module 900, to a voltage level between the terminal VN and the terminal VP of the battery controller 700. The control signal whose voltage level is converted is supplied to the gate of the switch element M72 of the bypass circuit 720.

The flow of the signal between the MPU 910 and the voltage detection circuit 750 of the embodiment is explained.

In this embodiment, the MPU 910 supplies a control signal SI being synchronous with a clock signal SCLK to the serial-parallel conversion circuit 760 (see FIG. 18). The control signal SI includes a chip address, a battery address and command contents. The chip address means an address for specifying the battery controller 700. The battery address means an address for specifying the cells BAT1 to BAT3. The command contents include ON/OFF information of the switch elements M72 to 74 of the bypass circuits 720 to 740.

The serial-parallel conversion circuit 760 outputs an output signal SO synchronously with the clock signal SCLK to the MPU 910. The output signal SO includes the chip address, the battery address, and the detection results of the voltage detection circuits 770 to 790.

A chip select signal for specifying the battery controller 700 is set in the serial-parallel conversion circuit 760 of the embodiment. The battery controller 700 of the embodiment determines that the control signal is sent to the battery controller 700 itself when the chip select signal set in the serial-parallel conversion circuit 760 and the chip address included in the control signal SI match. Then, the battery controller 700 reads the detected result of termination of charging, the detected result of the cell balance, and the detected result of over-discharge into the serial-parallel conversion circuit 760 based on the battery address and the command contents included in the control signal. Further, when the command contents includes indication of switching ON/OFF of the switch elements M72, M73 and M74, the battery controller 700 switches ON/OFF the switch elements of the corresponding bypass circuits.

Figure 21:
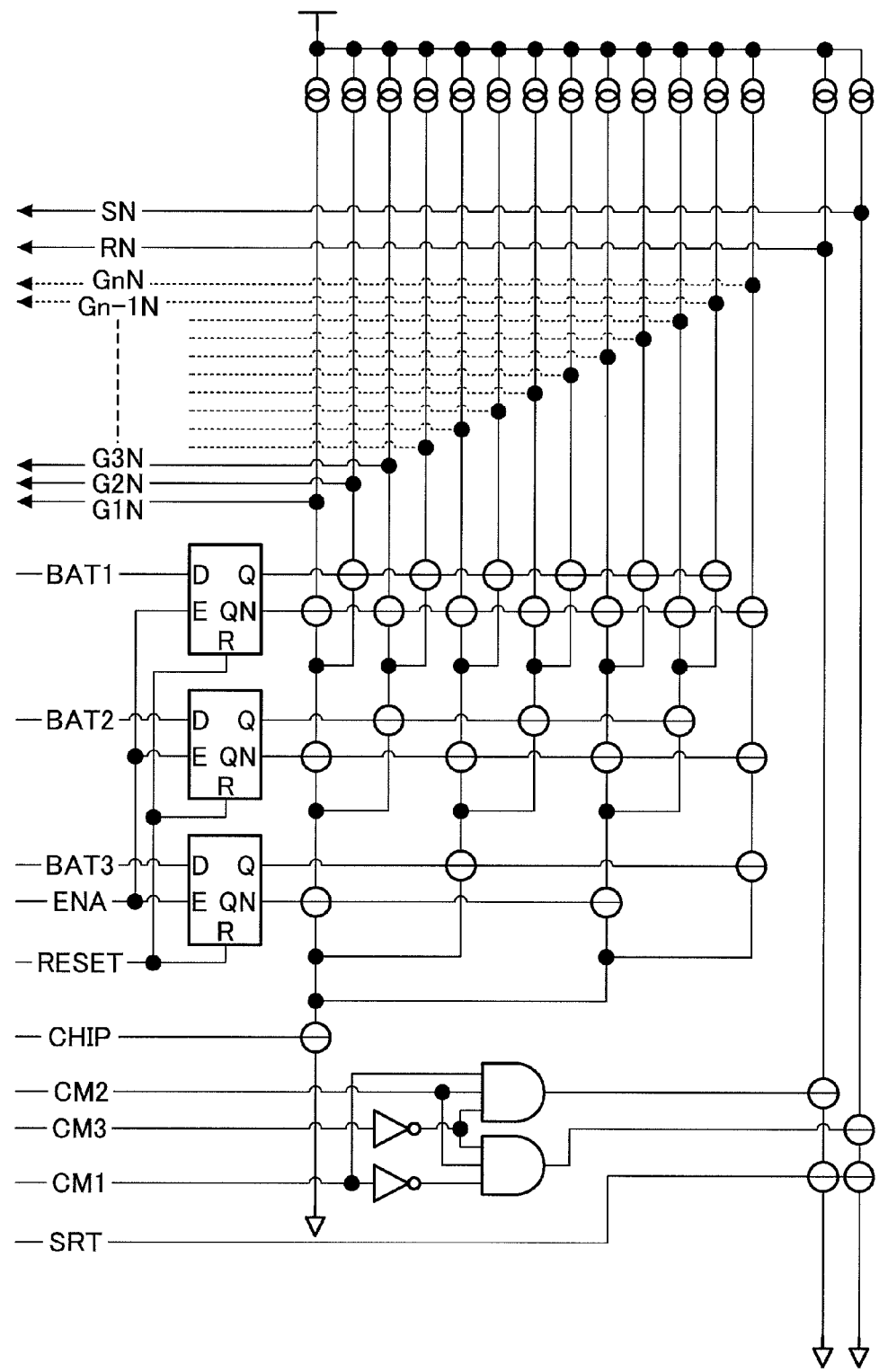
FIG. 21 is a diagram showing an example of a decoder included in the voltage level conversion circuit of the fifth embodiment.
Figure 22:
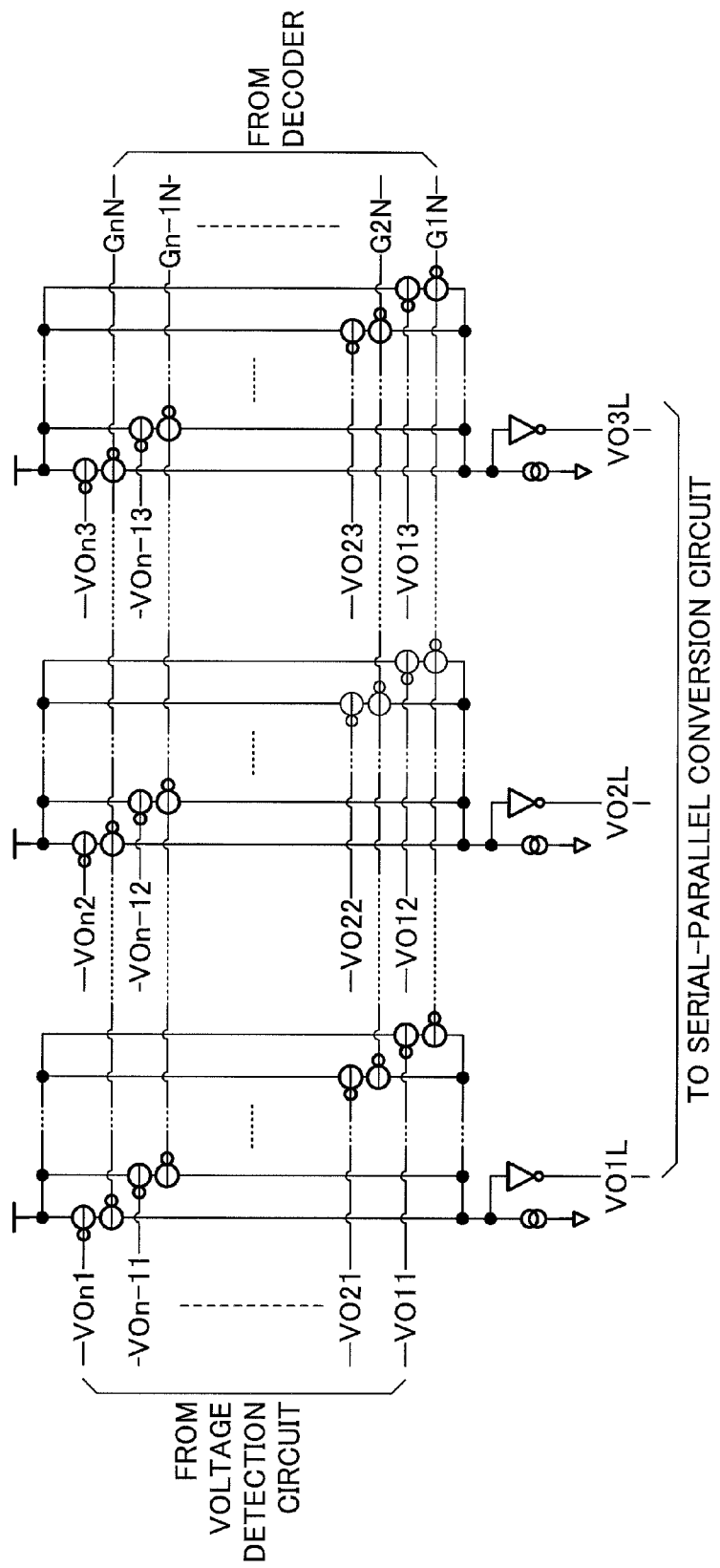
FIG. 22 is a diagram showing an example of an encoder included in the voltage level conversion circuit of the fifth embodiment.

FIG. 21 is a diagram showing an example of a decoder included in the voltage level conversion circuit of the fifth embodiment, and FIG. 22 is a diagram showing an example of an encoder included in the voltage level conversion circuit of the fifth embodiment. In this embodiment, when the chip select signal set in the serial-parallel conversion circuit 760 and the chip address included in the control signal SI match, a signal CHIP becomes H level so that the battery address of the cells BAT1 to BAT3 is decoded. When the battery address is decoded, the selected signal GxN, whose voltage level is converted to high voltage, becomes L level. The signal GxN is a battery select signal, and is supplied to the level conversion circuit 777 and to the encoder shown in FIG. 22.

The encoder is provided for sending the signal GxN and the detected result of charge termination, cell balance, and over-discharge of the selected cell to the serial-parallel conversion circuit 760.

The encoder outputs the detected result of the voltage detection circuit selected among the voltage detection circuits 770 to 790 as the signals VO1L, VO2L and VO3L to the serial-parallel conversion circuit 760.

The command contents included in the control signal SI are shown as the signals CM1, CM2 and CM3. In this embodiment, ON/OFF of the switch elements M72 to M74 are indicated by the combination of the signals CM1, CM2 and CM3. When the signals CM1, CM2 and CM3 indicate ON/OFF of the switch elements M72 to M74, outputs of the decoder, the signal SN and the signal RN, become L level. Thus, in the level conversion circuit 777, set and reset of latch are performed by L level of the signal GN, the signal SN and the signal RN. The output of the latch is output to the gates of the switch elements M72 to M74 of the bypass circuits 720 to 740.

Figure 23:
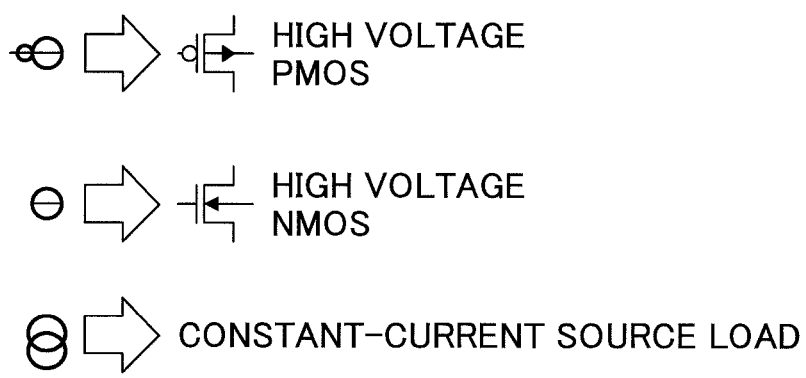
FIG. 23 is a diagram for explaining marks or symbols shown in FIG. 21 and FIG. 22.

The marks or symbols shown in FIG. 21 and FIG. 22 are high voltage MOS transistors and constant-current source loads, as shown in FIG. 23. FIG. 23 is a diagram for explaining the marks or symbols shown in FIG. 21 and FIG. 22.

Next, the operation of the MPU 910 of the embodiment is explained. The MPU 910 of the embodiment controls charging and discharging of the cells BAT1 to BAT3 based on the detected voltage by the voltage detection circuit 750 output via the serial-parallel conversion circuit 760.

Figure 24:
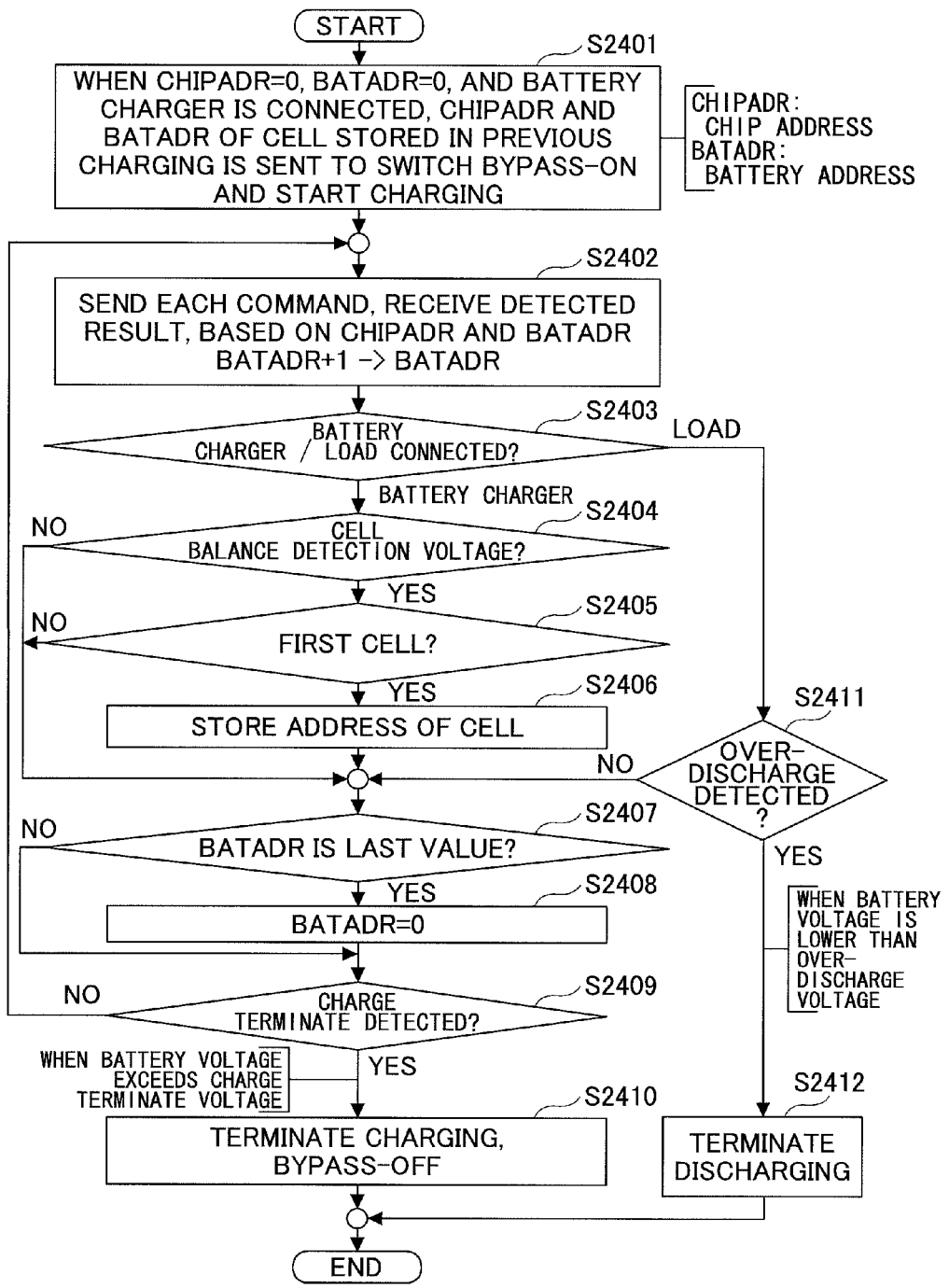
FIG. 24 is a first flowchart for explaining the operation of the MPU of the fifth embodiment.

First, with reference to FIG. 24, the operation of the MPU 910 when plural cells connected to the protection module 900 are set as a single group is explained. When the number of groups is one, the number of the charge-discharge control circuits provided in the protection module 900 is one. FIG. 24 shows a case where the charge-discharge control circuit 800 is provided in the protection module 900. FIG. 24 is a first flowchart for explaining the operation of the MPU of the fifth embodiment.

The MPU 910 of the embodiment sends the control signal SI including the chip address and the battery address to the charge-discharge control circuit 800, when the chip address and the battery address are 0, as well as when the protection module 900 is connected to the battery charger. Here, the chip address and the battery address specify the cell which is stored in the previous charging operation, and the command contents cause the switch element of the bypass circuit corresponding to the specified cell to be switched on. Then, the MPU 910 switches on the switch element of the corresponding bypass circuit and starts charging (step S2401).

The protection module 900 of the embodiment includes a unit (not shown in the drawings) that detects whether the protection module 900 is connected to the battery charger. The MPU 910 of the embodiment is provided with a storage area in which the position (address) of the cell which reaches the cell balance detection voltage first is stored.

Then, the MPU 910 sends the control signal SI including the chip address and the battery address to the charge-discharge control circuit 800, and receives the detected results. Then, the MPU 910 sets the battery address of a next cell subsequent to the cell for which the detected result is obtained in the control signal SI (step S2402).

Subsequently, the MPU 910 detects whether the protection module 900 is connected to the battery charger or to the load again (step S2403).

When the protection module 900 is connected to the battery charger in step S2403, the MPU 910 determines whether the voltage of the cell reaches the cell balance detection voltage based on the detected result received in step S2402 (step S2404).

When it is determined that the voltage of the cell reaches the cell balance detection voltage in step S2404, the MPU 910 determines whether the current cell is the first cell which reaches the cell balance detection voltage first (step S2405).

When it is determined that the cell is the first cell that reaches the cell balance detection voltage first in step S2405, the MPU 910 stores the position (address) of the cell (step S2406). Specifically, the MPU 910 stores the chip address and the battery address for specifying the cell.

When it is determined that the voltage of the cell does not reach the cell balance detection voltage in step S2404, or it is determined that the cell is not the first cell in step S2405, the process proceeds to step S2407, which will be explained later.

Subsequently, the MPU 910 determines whether the battery address is the last value (step S2407). It means that the MPU 910 determines whether the detection of voltages of all of the cells is completed. When the battery address is the last value, the MPU 910 sets 0 as the battery address (step S2408). When the battery address is not the last value in step S2407, the MPU 910 determines whether it is detected that the voltage of the cell reaches the charge terminate voltage based on the detected result received in step S2402 (step S2409).

When it is determined that the voltage of the cell reaches the charge terminate voltage in step S2409, the MPU 910 controls to terminate charging and switches off the switch element of the bypass circuit which is currently switched on (step S2410). When it is determined that the voltage of the cell does not reach the charge terminate voltage in step S2409, the MPU 910 repeats the processes from step S2402.

When the protection module 900 is connected to the load in step S2403, the MPU 910 determines whether the voltage of the cell reaches the over-discharge detection voltage based on the detected result received in step S2402 (step S2411). When it is determined that the voltage of the cell reaches the over-discharge detection voltage in step S2411, the MPU 910 controls to terminate discharge (step S2412). When it is determined that the voltage of the cell does not reach the over-discharge detection voltage in step S2411, the MPU 910 performs processes from step S2407.

As described above, in this embodiment, by the operation of the MPU 910, the switch element of the bypass circuit corresponding to the cell which reaches the cell balance detection voltage first can be switched on in the next charging cycle.

Figure 25:
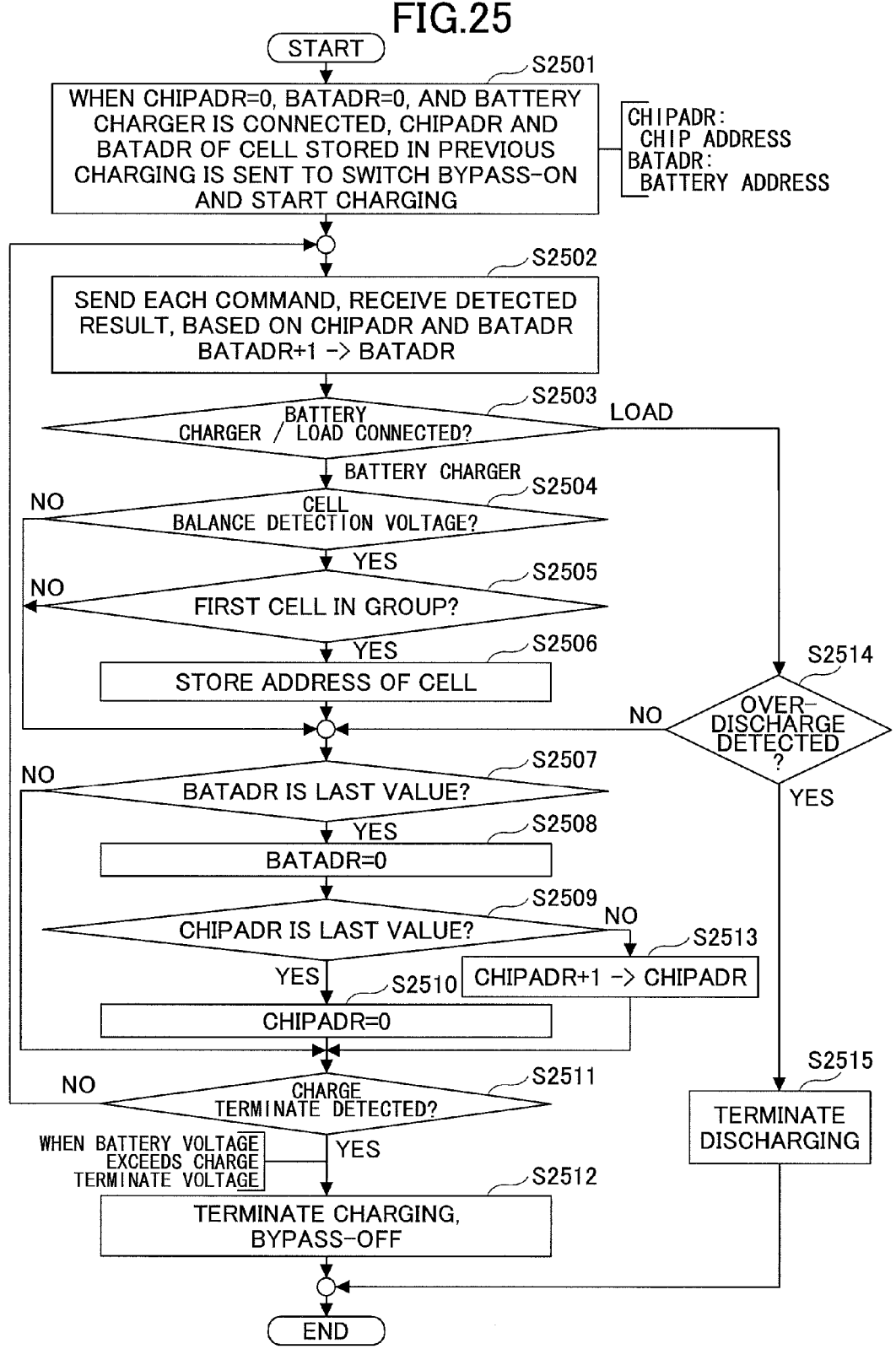
FIG. 25 is a second flowchart for explaining the operation of the MPU of the fifth embodiment.

Next, the operation of the MPU 910 when the plural cells are divided into plural groups corresponding to the battery controllers 700 to 700n is explained. FIG. 25 is a second flowchart for explaining the operation of the MPU of the fifth embodiment.

The processes of step S2501 to step S2508 in FIG. 25 are the same as the processes of step S2401 to step S2408 in FIG. 24. The processes of step S2501 to step S2508 are performed for each (one) of the plural groups.

When the battery address is set 0 in step S2508, the MPU 910 determines whether the chip address of the battery controller 700n corresponding to the group to which the processes of step S2502 to step S2508 are performed is the last value (step S2509). It means that the MPU 910 determines whether the processes of step S2502 to step S2508 are performed for all of the groups. In this embodiment, the battery controller 700n is provided for each of the groups. Therefore, the MPU 910 can change the target group of the cells by changing the chip address specifying the battery controller 700n corresponding to the group.

When it is determined that the chip address is the last value in step S2509, the MPU 910 sets 0 as the chip address included in the control signal SI (step S2510).

Subsequently, the MPU 910 determines whether the voltage of the cell reaches the charge terminate voltage based on the detected result received in step S2502 (step S2511). When the charge terminate voltage is detected in step S2511, the MPU 910 controls to terminate charging (step S2512). When the charge terminate voltage is not detected in step S2511, the MPU 910 repeats the processes from step S2502.

When the value of the chip address is not the last value in step S2509, the MPU 910 changes the value of the chip address included in the control signal SI to the value of the battery controller 700$n$+1 which is connected to the subsequent group of the cells (step S2513), and proceeds to step S2511.

As the processes of steps S2514 and S2515 are the same as the processes of steps S2411 and S2412 in FIG. 24, the explanation is not repeated.

As described above, in this embodiment, for the case where the cells are divided into the plural groups corresponding to the battery controllers 700$n$, the switch element of the bypass circuit corresponding to the cell which reaches the cell balance detection voltage first can be switched on in the next charging cycle for each of the groups.

Therefore, according to the embodiment, similar to other embodiments, the electric charge stored in the cells can be efficiently utilized and the lifetime of the battery pack can be extended.

Sixth Embodiment

The sixth embodiment is described with reference to drawings. In the sixth embodiment, only a point where a unit that detects whether the voltage of the cell reaches the charge terminate voltage, the cell balance detection voltage, or the over-discharge detection voltage is provided at the MPU side, is different from the fifth embodiment. For the explanation of the sixth embodiment in the following, only the differences from the fifth embodiment are explained, and the same components are given the same reference numerals as the fifth embodiment, and explanations are not repeated.

Figure 26:
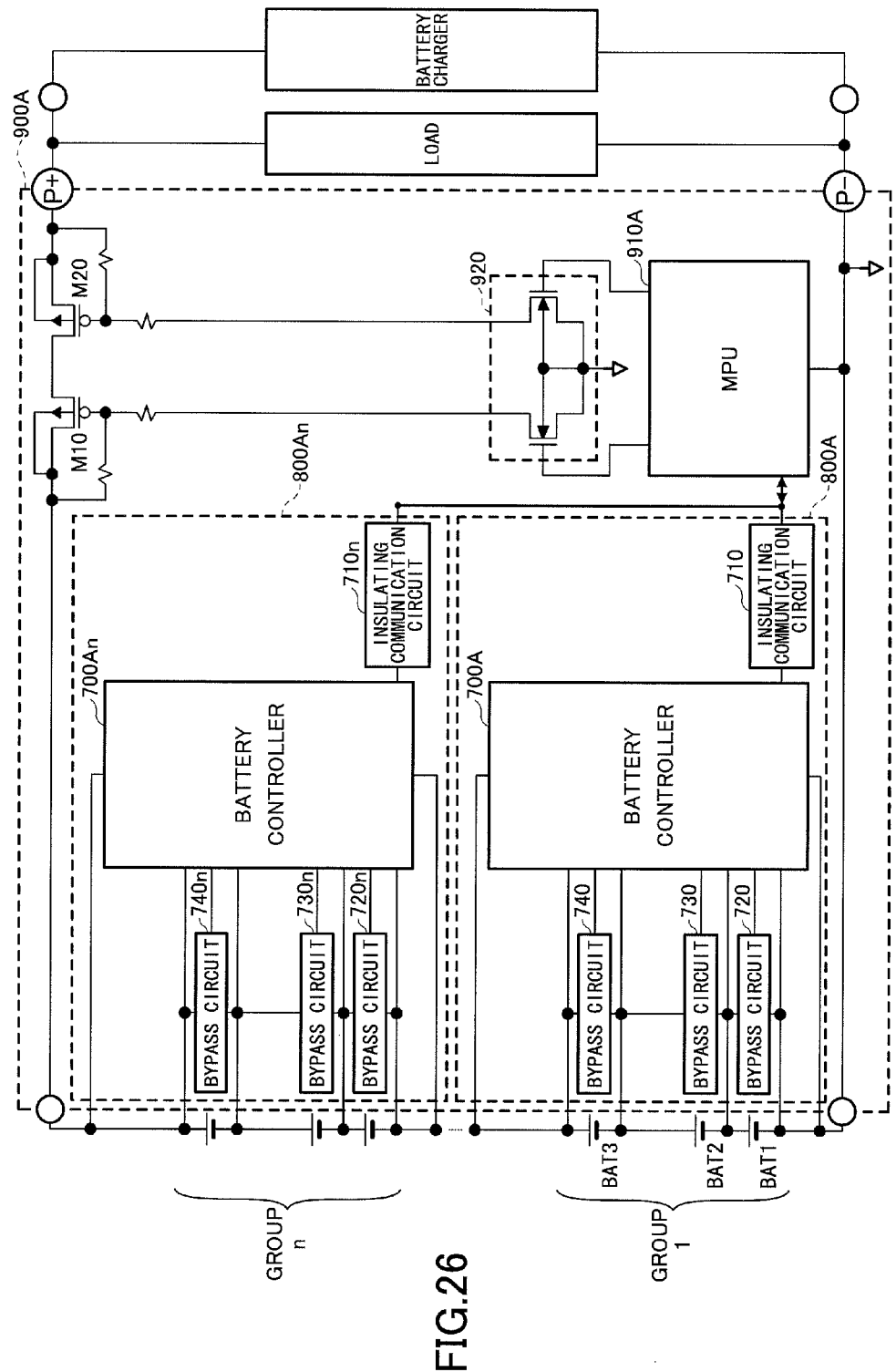
FIG. 26 is a view for explaining a charge-discharge control circuit of a sixth embodiment.

FIG. 26 is a diagram for explaining the charge-discharge control circuit of the sixth embodiment. First, a protection module 900A including charge-discharge control circuits 800A to 800An of the embodiment is explained. The protection module 900A of the embodiment includes the charge-discharge control circuits 800A to 800An, a MPU 910A, the level shift circuit 920, and the switch elements M10 and M20. The MPU 910A of the embodiment receives the voltages of the plural cells output from the charge-discharge control circuits 800A to 800An, and detects whether the voltage of the cell reaches the charge terminate voltage, the cell balance detection voltage, or the over-discharge detection voltage. Then, the MPU 910A sends the control signal SI based on the detected result to the charge-discharge control circuits 800A to 800An.

The charge-discharge control circuits 800A to 800An are explained in the following. As the charge-discharge control circuits 800A to 800An of the embodiment have the same structure, the charge-discharge control circuit 800A is explained as an example.

The charge-discharge control circuit 800A of the embodiment includes a battery monitor 700A, the insulating communication circuit 710, and the bypass circuits. The battery monitor 700A monitors the voltages of the cells BAT1, BAT2 and BAT3. The voltages monitored by the battery monitor 700A are supplied to the MPU 910A via the insulating communication circuit 710.

A charge terminate threshold voltage for detecting that the voltage of the cell reaches the charge terminate voltage, a cell balance threshold voltage for detecting that the voltage of the cell reaches the cell balance detection voltage, and an over-discharge threshold voltage for detecting that the voltage of the cell reaches the over-discharge detection voltage are set in the MPU 910A of the embodiment. The MPU 910A compares the voltage of the cell output from the battery monitor 700A and the above described corresponding threshold voltage, and determines whether the voltage of the cell reaches any of the charge terminate voltage, the cell balance detection voltage and the over-discharge detection voltage.

Figure 27:
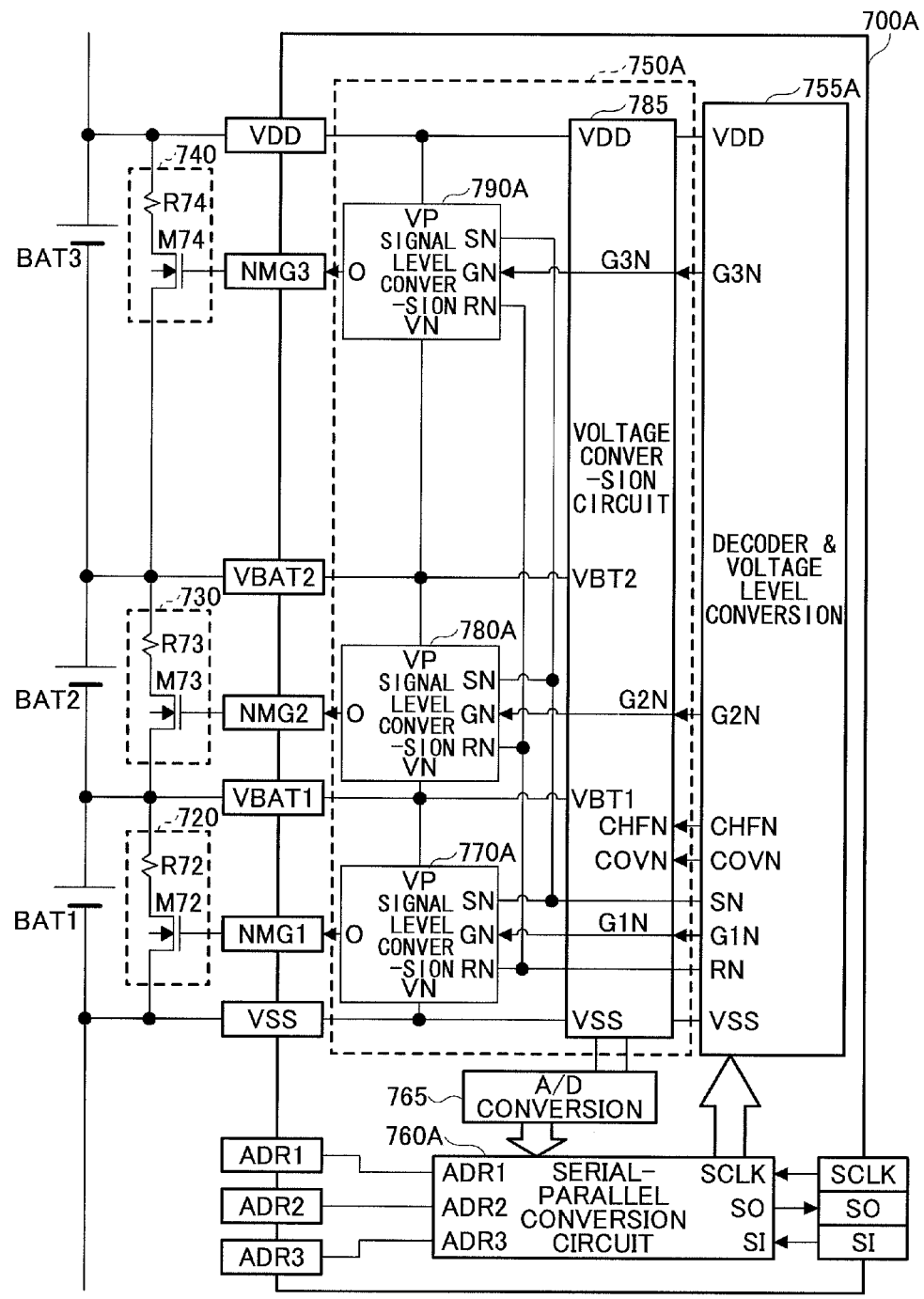
FIG. 27 is a view for explaining a battery monitor of the sixth embodiment.

FIG. 27 is a diagram for explaining the battery monitor of the sixth embodiment. The battery monitor 700A of the embodiment includes a voltage measurement circuit 750A, a voltage level conversion circuit 755A, a serial-parallel conversion circuit 760A, and an A/D conversion circuit 765.

The voltage measurement circuit 750A includes signal level conversion circuits 770A, 780A and 790A, and a voltage conversion circuit 785.

The signal level conversion circuits 770A, 780A and 790A of the embodiment have the same structure as the level conversion circuit 777 of the fifth embodiment.

The voltage conversion circuit 785 of the embodiment converts the voltages of the cells BAT1, BAT2 and BAT3 to voltages, for which the reference voltage is uses as a reference, to be output to the A/D conversion circuit 765.

Figure 28:
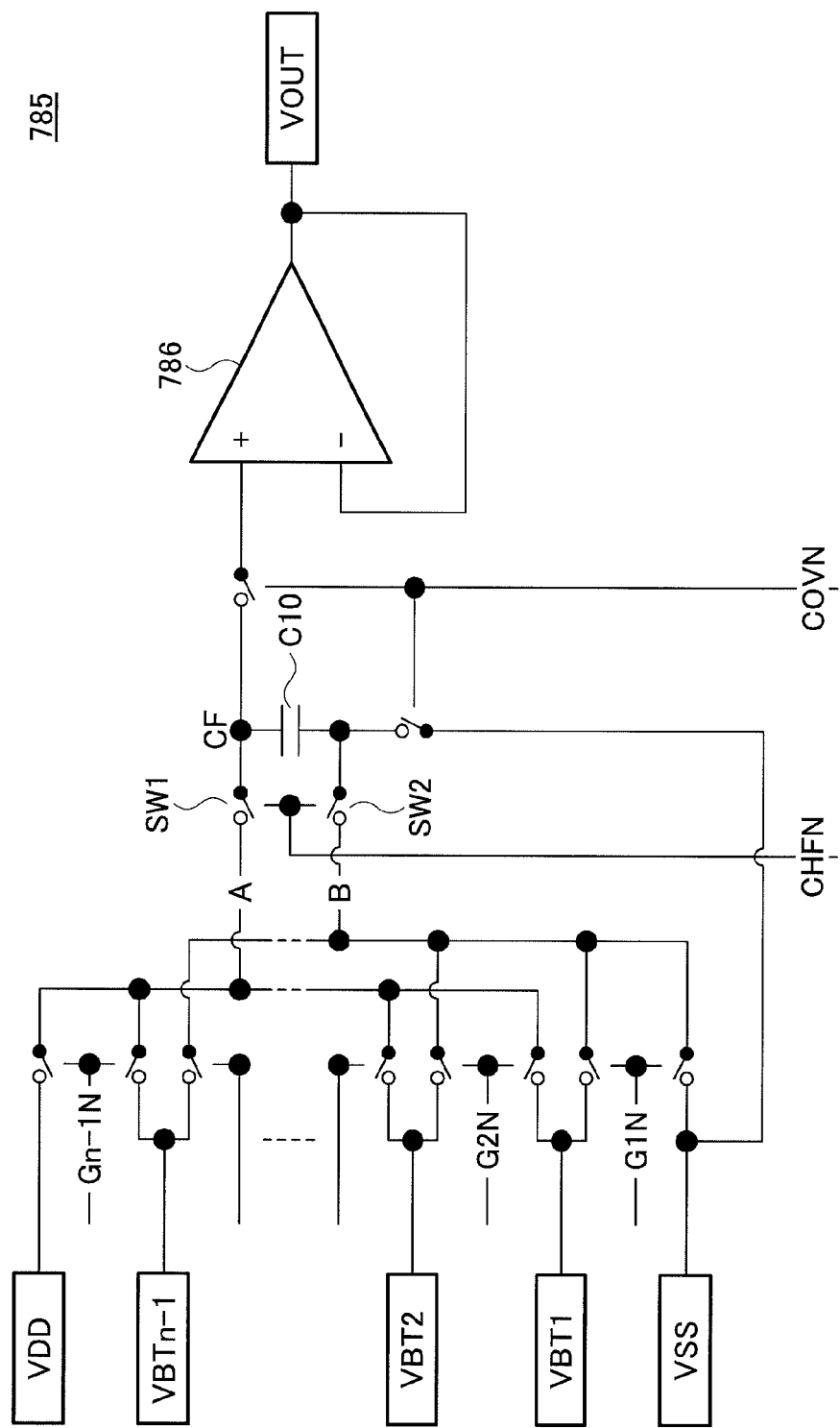
FIG. 28 is a diagram showing an example of a voltage conversion circuit of the sixth embodiment.

FIG. 28 is a diagram showing an example of the voltage conversion circuit of the sixth embodiment. For the voltage conversion circuit 785 of the embodiment, the voltage of the cell selected by the signal GxN, which is the battery select signal generated by the decoder of the voltage level conversion circuit 755A, is applied between a connecting point A and a connected point B. The voltage is accumulated in the capacitor element C10 via the switches SW1 and SW2 controlled by the signal CHFN.

The terminal of the capacitor element C10 at the anode side is connected to the VSS terminal, which is the reference, by the signal COVN. The terminal of the capacitor element C10 at the cathode side is connected to a positive input terminal of an operational amplifier 786. The output of the operational amplifier 786 is connected to a negative input terminal to form an amplifier of gain=1. Further, the output of the operational amplifier 786 is supplied to the A/D conversion circuit 765.

Figure 29:
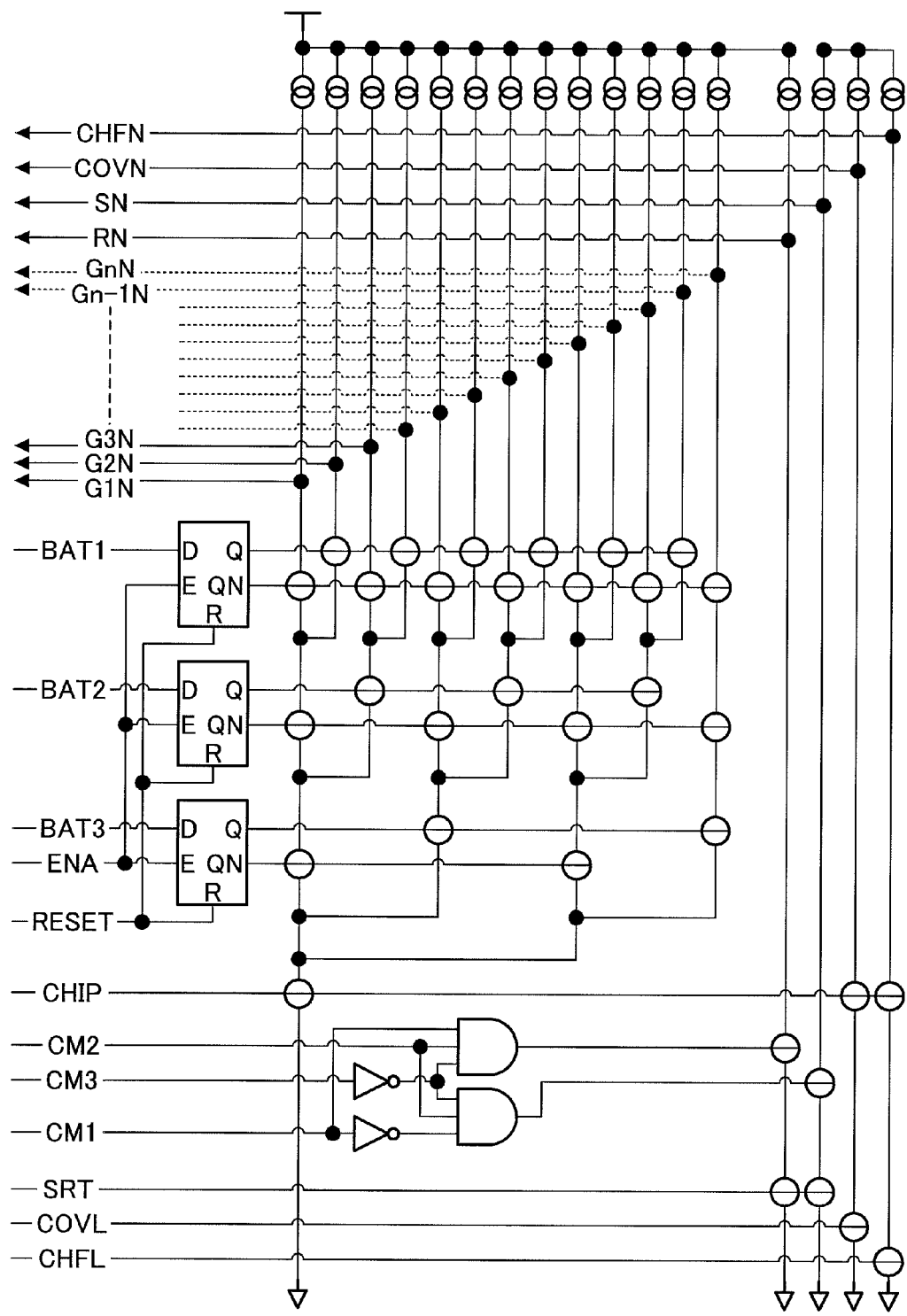
FIG. 29 is a diagram showing an example of a decoder included in the voltage level conversion circuit of the sixth embodiment.

FIG. 29 is a diagram showing an example of the decoder included in the voltage level conversion circuit of the sixth embodiment. The decoder of the embodiment further includes the level-shifts of the signal CHFN and the signal COVN in addition to the components of the decoder of the fifth embodiment. The marks or the symbols shown in FIG. 29 are the same as those shown in FIG. 23.

The operation of the MPU 910A of the embodiment is explained in the following. First, the operation of the MPU 910A when the plural cells connected to the protection module 900A are set as a single group is explained.

The processes of the MPU 910A of the embodiment, other than step S2404, step S2409 and step S2411 in FIG. 24, are the same as those shown in FIG. 24. The MPU 910A of the embodiment compares the voltage of the cell output from the battery monitor 700A via the insulating communication circuit 710 and the cell balance threshold voltage set in the MPU 910A and determines whether the voltage of the cell reaches the cell balance detection voltage in a step corresponding to step S2404.

Similarly, the MPU 910A compares the voltage of the cell and the charge terminate threshold voltage set in the MPU 910A and determines whether the voltage of the cell reaches the charge terminate voltage in a step corresponding to step S2409.

Further, the MPU 910A compares the voltage of the cell and the over-discharge threshold voltage stored in the MPU 910A and determines whether the voltage of the cell reaches the over-discharge voltage in a step corresponding to step S2411.

Next, the operation of the protection module 900A when the plural cells connected to the protection module 900A are divided into plural groups is explained. The processed of the MPU 910A of the embodiment, other than step S2504, step S2511 and step S2514 in FIG. 25, are the same as the processes in FIG. 25. The process of step S2504 is the same as that of step S2404, the process of step S2511 is the same as that of step S2409, and the process of step S2514 is the same as that of step S2411.

Thus, according to the embodiment, similar to the fifth embodiment, the electric charge stored in the cells can be efficiently utilized and the lifetime of the battery pack can be extended.

The present invention is not limited to the specifically disclosed embodiments, and variations and modifications may be made without departing from the scope of the present invention.

The present embodiment is applicable to a protection module for protecting a secondary battery.

The present international application is based on Japanese Priority Application No. 2009-246814 filed on Oct. 27, 2009, the entire contents of which are hereby incorporated herein by reference.

Further, the present international application is based on Japanese Priority Application No. 2010-27467 filed on Feb. 10, 2010, the entire contents of which are hereby incorporated herein by reference.

What is claimed is:

1. A charge-discharge control circuit for controlling cycles of charging and discharging of a secondary battery including plural cells, comprising:
   a cell balance detection circuit that detects that a voltage of at least one of the plural cells reaches a predetermined voltage in a first charging operation;
   a memory circuit that memorizes a first cell that reaches the predetermined voltage first among the plural cells in the first charging operation;
   bypass circuits respectively connected to the plural cells in parallel, each of the bypass circuits including a switch unit for bypassing the current that flows through the corresponding cell when charging; and
   a control circuit that controls,
   in a second charging operation after the secondary battery charged by the first charging operation is discharged, the switch unit corresponding to the first cell memorized by the memory circuit so that the switch unit corresponding to the first cell is switched on from a start to an end of the second charging operation.

2. The charge-discharge control circuit according to claim 1,
   wherein the predetermined voltage is a charge terminate voltage that detects termination of the cells.

3. The charge-discharge control circuit according to claim 1, further comprising:
   an over-discharge detection circuit that detects that a voltage of the cell becomes lower than or equal to a predetermined voltage;
   a discharge control circuit that controls discharging of the cells based on the detected result by the over-discharge detection circuit;
   a charge termination detection circuit that detects that a voltage of the cell becomes higher or equal to a charge terminate voltage; and
   a charge control circuit that controls charging of the cells based on the charge termination detection circuit or the cell balance detection circuit.

4. The charge-discharge control circuit according to claim 3, further comprising:
   a transistor for controlling discharging for which ON/OFF is controlled based on the detected result by the over-discharge detection circuit; and
   a transistor for controlling charging for which ON/OFF is controlled by the charge control circuit.

5. A semiconductor integrated circuit for controlling cycles of charging and discharging of a secondary battery including plural cells, comprising:
   a cell balance detection circuit that detects that a voltage of at least one of the plural cells reaches a predetermined voltage in a first charging operation;
   a memory circuit that memorizes a first cell that reaches the predetermined voltage first among the plural cells in the first charging operation; and
   a control circuit that controls switch units of bypass circuits, each of the bypass circuits including the switch unit for bypassing the current that flows through the corresponding cell when charging;
   wherein the control circuit controls, in a second charging operation after the secondary battery charged by the first charging operation is discharged, the switch unit corresponding to the first cell memorized by the memory circuit so that the switch unit corresponding to the first cell is switched on from a start to an end of the second charging operation.

6. The semiconductor integrated circuit according to claim 5, further comprising:
   the bypass circuits.

7. A method of controlling charging and discharging by a charge-discharge control circuit that controls cycles of charging and discharging of a secondary battery including plural cells, comprising:
   a cell balance detecting step of detecting that a voltage of at least one of the plural cells reaches a predetermined voltage in a first charging operation;
   a memorizing step of memorizing a first cell in a memory circuit that reaches the predetermined voltage first among the plural cells in the first charging operation; and
   a controlling step of controlling switch units of bypass circuits, each of the bypass circuits including the switch unit for bypassing the current that flows through the corresponding cell when charging;
   wherein in the controlling step, in a second charging operation after the secondary battery charged by the first charging operation is discharged, the switch unit corresponding to the first cell memorized in the memorizing is controlled so that the switch unit corresponding to the first cell is switched on from a start to an end of the second charging operation.

8. The charge-discharge control circuit according to claim 1,
   wherein each of the bypass circuits functions to decrease the current that flows through the corresponding cell when charging.

9. The charge-discharge control circuit according to claim 1,
   wherein the cell balance detection circuit that detects that a voltage of at least one of the plural cells reaches a predetermined voltage in the second charging operation, wherein the memory circuit memorizes a second cell that reaches the predetermined voltage first among the plural cells in the second charging operation, and wherein the control circuit controls, in a third charging operation after the secondary battery charged by the second charging operation is discharged, the switch unit corresponding to the second cell memorized by the memory circuit so that the switch unit corresponding to the second cell is switched on from a start to an end of the third charging operation.

10. The semiconductor integrated circuit according to claim 5, wherein each of the bypass circuits functions to decrease the current that flows through the corresponding cell when charging.

11. The semiconductor integrated circuit according to claim 5, wherein the cell balance detection circuit that detects that a voltage of at least one of the plural cells reaches a predetermined voltage in the second charging operation, wherein the memory circuit memorizes a second cell that reaches the predetermined voltage first among the plural cells in the second charging operation, and wherein the control circuit controls, in a third charging operation after the secondary battery charged by the second charging operation is discharged, the switch unit corresponding to the second cell memorized by the memory circuit so that the switch unit corresponding to the second cell is switched on from a start to an end of the third charging operation.

12. The method of controlling charging and discharging according to claim 7, wherein each of the bypass circuits functions to decrease the current that flows through the corresponding cell when charging.

13. The method of controlling charging and discharging according to claim 7, further comprising:

a second cell balance detecting step of detecting that a voltage of at least one of the plural cells reaches a predetermined voltage in the second charging operation;

a second memorizing step of memorizing a second cell in the memory circuit that reaches the predetermined voltage first among the plural cells in the second charging operation; and a second controlling step of controlling, in a third charging operation after the secondary battery charged by the second charging operation is discharged, the switch unit corresponding to the second cell memorized in the memorizing is controlled so that the switch unit corresponding to the second cell is switched on from a start to an end of the third charging operation.

* * * * *